United States Patent [19]
Higashi

[11] Patent Number: 5,854,376
[45] Date of Patent: Dec. 29, 1998

[54] ALIPHATIC ESTER-AMIDE COPOLYMER RESINS

[75] Inventor: Takashi Higashi, Nara, Japan

[73] Assignee: Sekisui Kaseihin Kogyo Kabushiki Kaisha, Nara, Japan

[21] Appl. No.: 613,622

[22] Filed: Mar. 11, 1996

[30] Foreign Application Priority Data

| | | | |
|---|---|---|---|
| Mar. 9, 1995 | [JP] | Japan | 7-049737 |
| May 18, 1995 | [JP] | Japan | 7-120293 |
| Aug. 8, 1995 | [JP] | Japan | 7-202438 |

[51] Int. Cl.$^6$ .................................................. C08G 69/44
[52] U.S. Cl. ........................... 528/288; 528/176; 528/185; 528/271; 528/272; 528/292; 528/310; 528/322; 528/332
[58] Field of Search ..................................... 528/185, 176, 528/271, 272, 288, 292, 322, 310, 332

[56] References Cited

U.S. PATENT DOCUMENTS

| | | | |
|---|---|---|---|
| 2,359,878 | 10/1944 | Schupp, Jr. | 524/391 |
| 2,430,860 | 11/1947 | Cairns | 525/427 |
| 4,966,956 | 10/1990 | Andreu et al. | 528/185 |

FOREIGN PATENT DOCUMENTS

| | | |
|---|---|---|
| 0 641 817 A2 | 8/1994 | European Pat. Off. . |
| 43-10636 | 5/1968 | Japan . |
| 48-16997 | 5/1973 | Japan . |
| 53-30692 | 3/1978 | Japan . |
| 54-119594 | 9/1979 | Japan . |
| 56-38115 | 9/1981 | Japan . |
| 57-26688 | 6/1982 | Japan . |
| 5-156008 | 6/1993 | Japan . |
| 6-192417 | 7/1994 | Japan . |
| 6-200016 | 7/1994 | Japan . |

OTHER PUBLICATIONS

I. Goodman et al., Copolyesteramides–II, Eur. Polym. J. vol. 20, No. 6, pp. 529–537 (1984).
I. Goodman et al., Copolyesteramides–III, Eur. Polym. J. vol. 20, No. 6, pp. 539–547 (1984).
I. Goodman, Copolyesteramides–IV, Eur. Polym. J. vol. 20, No. 6, pp. 549–557 (1984).

*Primary Examiner*—P. Hampton-Hightower
*Attorney, Agent, or Firm*—Armstrong, Westerman, Hattori, McLeland & Naughton

[57] ABSTRACT

A composition of an aliphatic ester-amide copolymer which is soluble in an organic solvent with an $LD_{50}$ value (orally administered to a rat) of about 2,000 mg/kg or more.

30 Claims, 7 Drawing Sheets

ALIPHATIC ESTER-AMIDE COPOLYMER RESINS

FIELD OF THE INVENTION

The present invention relates to aliphatic ester-amide copolymers, their modified resins, and a solution and composition thereof. Particularly, the aliphatic ester-amide copolymers of the present invention are soluble in an organic solvent which is not harmful to the human body with or without addition of an inorganic metal salt. The aliphatic ester-amide copolymers may exhibit biodegradability. The copolymers of the present invention can be used safely for various applications.

BACKGROUND OF THE INVENTION

Biodegradable plastics typified by aliphatic polyester resins have been receiving considerable attention as increasing attention has been paid to environmental problems in recent years, and are expected to be used in a lot of applications. However, since there exist no good solvents for the aliphatic polyesters which can be handled easily, it is significantly difficult to mold the aliphatic polyester resin by a method generally used for molding conventional plastics such as a solvent-cast method. Known solvents are formic acid, hexafluoro-2-propanol and m-cresol, but they are very harmful to the human body or environment, for example some of them depleting the ozone layer. Handling such a solvent is very difficult and it requires a large investment in equipment to use it. Thus disadvantageously the aliphatic polyesters have only much limited use since they cannot be molded from solution thereof.

The aliphatic ester-amide copolymers, as described in Japanese Examined Patent Publication Nos. JP-56-B-38115 and JP-57-B-26688, Japanese Unexamined Patent Publication Nos. JP-06-A-200016 and JP-06-A-192417, are excellent resins which have toughness of aliphatic amide resins together with good workability of aliphatic ester resins and also have biodegradability of aliphatic polyester resins.

However, similarly to the aliphatic polyesters, no other solvents are known which can give a solution state to the aliphatic ester-amide copolymers than formic acid, hexafluoro-2-propanol and m-cresol which are harmful to the human body or environment. For molding such a resin, a solvent such as formic acid, hexafluoro-2-propanol or m-cresol is required to be used. Therefore the aliphatic ester-amide copolymers have the similar defects to the above aliphatic polyester resins.

On the other hand, in manufacturing artificial leather using an aliphatic polyamide, a step is conventionally known wherein the aliphatic polyamide is dissolved in a solution of a metal salt typified by calcium chloride in methanol or ethanol, followed by application thereof to a substrate such as non-woven and washing. The obtained reprecipitated resin has a leather-like surface (see U.S. Pat. No. 2,359,878). The thus obtained aliphatic polyamide resin, however, does not have good workability because heat treatment for smoothing the surface of the reprecipitated resin must be conducted at a high temperature due to the high melting point thereof. Further, such an aliphatic polyamide is not biodegradable.

Nylon resins are conventionally modified with N-alkoxymethyl by reacting them with formaldehyde and a lower alcohol so as to lower the molding temperature, improve the workability and give softness. The type-8 nylon is actually utilized. It is also known that the N-alkoxymethyl nylon has a characteristic of being soluble in alcohols. Although such modified aliphatic polyamides have excellent properties, they cannot be microbiologically degraded or disintegrated.

SUMMARY OF THE INVENTION

It is an object of the present invention to provide a composition of an aliphatic ester-amide copolymer which is soluble in an organic solvent with an $LD_{50}$ value (orally administered to a rat) of about 2,000 mg/kg or more. The present invention provides a solution of an aliphatic ester-amide copolymer in which the copolymer is dissolved in an organic solvent with an $LD_{50}$ value (orally administered to a rat) of about 2,000 mg/kg or more in the presence or absence of an inorganic-metal salt. The present invention also provides a molded or cast article produced by dissolving a composition of an aliphatic ester-amide copolymer in an organic solvent with an $LD_{50}$ (orally administered to a rat) value of about 2,000 mg/kg or more in the presence or absence of an inorganic metal salt and then removing the solvent from the solution to change a configuration of the copolymer.

DETAILED DESCRIPTION OF THE INVENTION

Figure 1:
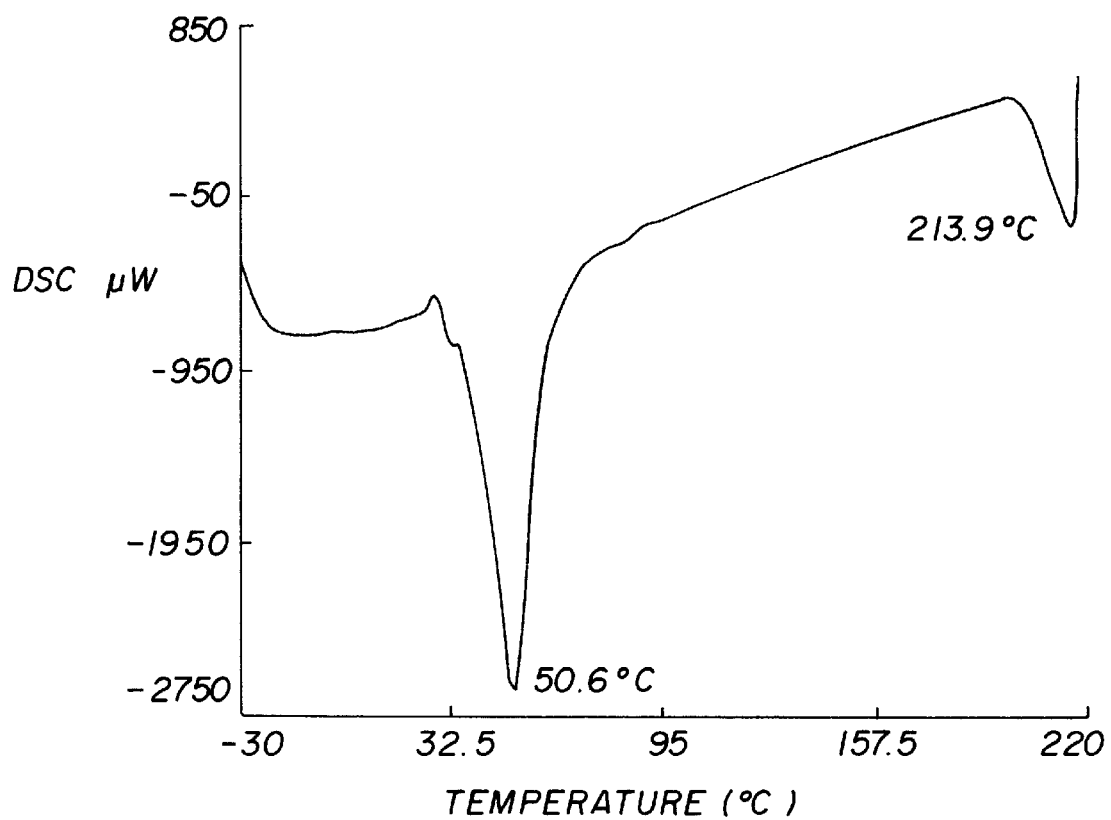
FIG. 1 shows a DSC chart of an unmodified aliphatic ester-amide copolymer of the present invention.

The present invention is based on a finding that an aliphatic ester-amide copolymer can be dissolved in an organic solvent which has low toxicity and is not harmful to the human body, especially an organic solvent which has an LD50 of at least 2,000 mg/kg (orally administrated to a rat), in the presence or absence of an inorganic metal salt. Therefore, the invention provides such a solution.

According to one aspect of the invention, it provides an aliphatic ester-amide copolymer soluble in the above mentioned solvent which has a low weight-average molecular weight from about 1,000 to 10,000 and has biodegradability. Such resin is believed not to have been disclosed in any literatures.

According to a further aspect the invention, it provides a new modified aliphatic ester-amide copolymer in which at least a part of amide units of an aliphatic ester-amide copolymer are modified with an alkoxymethyl and/or hydroxymethyl group. The modified copolymer can exhibit biodegradability and has a property of being soluble even in the presence or absence of an inorganic metal salt.

The low-toxic organic solvents used in the invention are preferably aliphatic organic solvents with an LD50 value of about 2,000 mg/kg or more which do not harm the human body. Examples of the aliphatic organic solvents are an aliphatic alcohol having 6 or less carbons, an aliphatic glycolic ether type compound represented by the following formula (A):

$$R_9(OCH_2CH_2)nR_{10} \quad (A)$$

wherein $R_9$ represents a $C_{1-4}$ alkyl group, $R_{10}$ represents a hydroxyl, $C_{1-4}$ alkoxy, amino or acetyl group, and n represents an integer from 1 to 3, a $C_{2-6}$ aliphatic acid, a $C_{2-6}$ aliphatic sulfoxide and a $C_{2-6}$ aliphatic amide.

Examples of the above $R_9$ are —$CH_3$ and —$CH_2CH_3$, and examples of the above $R_{10}$ are —OH, —$OCH_3$, —$OCH_2CH_3$, —$NH_2$ and —$OCOCH_3$.

Examples of the above aliphatic alcohol are methanol, ethanol, propanol, isopropanol, butanol, ethylene glycol, glycerin and hexanediol. Most preferable alcohols are methanol and ethanol. Examples of the aliphatic glycolic ether type compound are 2-ethoxyethanol, 2-methoxyethanol, 2-(2-ethoxyethoxy)ethanol, 2-ethoxyethyl acetate and 2-methoxyethylamine. Most preferable ethers are 2-ethoxyethanol and 2-methoxyethanol. Examples of the aliphatic acid are acetic acid, propionic acid, butyric acid, lactic acid and hydroxycaproic acid. An Example of the aliphatic sulfoxide is dimethyl sulfoxide. Examples of the aliphatic amide are dimethylformamide and N-methyl-2-pyrrolidone.

These aliphatic organic solvents may be used independently or optionally as a mixture thereof.

The boiling point of the aliphatic organic solvent is preferably within the range from about 30° C. to 250° C., taking into account a easier handling at room temperature and drying by removal of the solvent from the resin. Particularly preferable aliphatic organic solvents are methanol, ethanol, 2-ethoxyethanol, 2-methoxyethanol, acetic acid, dimethyl sulfoxide and a mixture thereof.

The conventionally used solvents such as formic acid, chloroform, hexafuluoro-2-propanol and m-cresol are very harmful to the human body and very likely to destroy the environment, for example causing depletion of the ozone layer. Therefore, in use, they are significantly difficult to handle and need expensive equipment. The aliphatic organic solvent of the present invention has an LD50 value (orally administered to a rat) of about 2,000 mg/kg or more. The LD50 values of the aliphatic organic solvents of the present invention and conventionally used organic solvents are shown in the following table:

TABLE 1

| Organic solvent | LD50 value (mg/kg) |
|---|---|
| Methanol | 5,628 |
| Ethanol | 7,060 |
| 2-Ethoxyethanol | 3,000 |
| 2-Methoxyethanol | 2,460 |

TABLE 1-continued

LD50 values of organic solvents

| Organic solvent | LD50 value (mg/kg) |
|---|---|
| Formic acid | 1,100 |
| Chloroform | 908 |
| m-Cresol | 242 |

The above described aliphatic organic solvent may contain water. Whether the solvent should contain water or not and, if contains, how much water it should contain can be suitable decided, depending on how resin is used, in what thickness the resin is applied or the like. In addition, in order to obtain a solution containing a lot of resin, the water content is preferably small.

The term "dissolved" or "soluble" according to the present invention means that 1 part by weight or more of resin makes a homogeneous solution in 100 parts by weight of solvent at room temperature or with heating to a temperature up to the boiling point of the organic solvent used. The term also refers to a state in which (especially at room temperature) a resin and solvent are substantially homogeneous, a part of the resin gels or the organic solvent separates to some extent, without substantial separation of the organic solvent or precipitation of the resin.

A preferable group of the aliphatic ester-amide copolymers of the present invention have a weight-average molecular weight within the range from about 1,000 to about 10,000. It has been found that such a resin can be dissolved in the above-described organic solvent which is not harmful to the human body. Therefore, the resin can be easily molded by the solvent-cast method using a solution thereof. The weight-average molecular weight is preferably from about 4,000 to about 9,000, especially about 4,000; 4,500; 5,000; 5,500; 6,000; 7,000; 8,000; and 9,000.

The aliphatic ester-amide copolymer of the invention is preferably biodegradable. The aliphatic ester-amide copolymer, when the content of amide units on the main chain thereof is from about 10 to about 80 mol %, preferably from about 10 to about 60 mol %, become an excellent resin which can exert the toughness of the aliphatic amide together with the good workability of the aliphatic ester and further can exert the biodegradability of the aliphatic polyester.

The aliphatic ester-amide copolymer of the invention is constituted of a ester unit and amide unit.

The ester unit may be any ester unit unless it contains an aromatic ring. For a preferable example, the ester unit is represented by the following formula (1):

$$—O—R_1—CO— \quad (1)$$

wherein $R_1$ represents a $C_{1-6}$ straight-chain alkylene group or a branched chain alkylene group in which a part of the hydrogen atoms of said straight-chain alkylene is/are substituted with a $C_{1-3}$ alkyl group and/or the following formula (2):

$$—O—R_2—OCO—R_3—CO— \quad (2)$$

wherein $R_2$ represents a $C_{2-6}$ straight-chain alkylene group or a branched chain alkylene group in which a part of the hydrogen atoms of said straight-chain alkylene is/are substituted with a $C_{1-3}$ alkyl group and $R_3$ represents a $C_{2-10}$ straight-chain alkylene group or a branched chain alkylene group in which a part of hydrogen atoms of said straight-chain alkylene is/are substituted with a $C_{1-3}$ alkyl group. The ester unit of the formula (1) or (2) can be contained singly or in the combination of the two.

Examples of the above $R_1$ are —$CH_2$—, —$CH(CH_3)$—, —$CH(CH_3)CH_2$—, —$CH(C_2H_5)CH_2$—, —$CH(CH_3)(CH_2)_3$—, and —$(CH_2)_5$—. Examples of $R_2$ are —$(CH_2)_2$—, —$CH(CH_3)CH_2$—, —$(CH_2)_4$—, and —$(CH_2)_6$—. Examples of $R_3$ are —$(CH_2)_2$—, —$CH(CH_3)CH_2$—, —$(CH_2)_4$—, —$(CH_2)_6$—, and —$(CH_2)_8$—.

The amide unit may be any amide unit unless it contains an aromatic ring. For preferably example, the amide unit is represented by the following formula (3):

$$—NH—R_4—CO— \qquad (3)$$

wherein $R_4$ represents a $C_{2-12}$ straight-chain alkylene group or a branched chain alkylene group in which a part of hydrogen atoms of said straight-chain alkylene is/are substituted with a $C_{1-3}$ alkyl group, and/or the formula (4)

$$—NH—R_5—NHCO—R_6—CO— \qquad (4)$$

wherein $R_5$ represents a $C_{2-6}$ straight-chain alkylene group or a branched chain alkylene group in which a part of the hydrogen atoms of said straight-chain alkylene is/are substituted with a $C_{1-3}$ alkyl group and $R_6$ represents a $C_{2-10}$ straight-chain alkylene group or a branched chain alkylene group in which a part of the hydrogen atoms of said straight-chain alkylene is/are substituted with a $C_{1-3}$ alkyl group. The amide unit of the formula (3) or (4) can be contained singly or in the combination of the two.

Examples of the above $R_4$ are —$CH_2$—, —$CH(CH_3)$—, —$CH(CH_3)CH_2$—, —$CH(C_2H_5)CH_2$—, —$CH(CH_3)(CH_2)_3$—, and —$(CH_2)_5$—. Examples of $R_5$ are —$(CH_2)_2$—, —$CH(CH_3)CH_2$—, —$(CH_2)_4$—, and —$(CH_2)_6$—. Examples of $R_6$ are —$(CH_2)_2$—, —$CH(CH_3)CH_2$—, —$(CH_2)_4$—, —$(CH_2)_6$—, and —$(CH_2)_8$—.

Another group of aliphatic ester-amide copolymers used of the present invention are modified aliphatic ester-amide copolymers in which a part or all of the hydrogen atoms of the amide groups of the aliphatic ester-amide copolymer are substituted with an alkoxymethyl and/or hydroxymethyl group.

The ester unit of the modified aliphatic ester-amide copolymer is preferably represented by the following formula (1):

$$—O—R_1—CO— \qquad (1)$$

wherein $R_1$ represents the same as defined above, and/or the following formula (2):

$$—O—R_2—OCO—R_3—CO— \qquad (2)$$

wherein $R_2$ and $R_3$ represent the same as defined above. The ester unit of the formula (1) or (2) can be contained singly or in the combination of the two.

The substituted amide unit of the modified aliphatic ester-amide copolymer is preferably represented by the following formula (3):

$$—NR_7—R_4—CO— \qquad (3')$$

wherein $R_7$ represents a hydrogen atom, an alkoxymethyl or hydroxymethyl group and R4 represents the same as defined above and/or the formula (4')

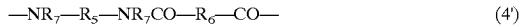

$$—NR_7—R_5—NR_7CO—R_6—CO— \qquad (4')$$

wherein two $R_7$ represent, the same or different, the same as defined above, and $R_5$ and $R_6$ represent the same as defined above. The amide unit of the formula (3') or (4') can be contained singly or in the combination of the two.

Examples of the above $R_7$ are —H, —$CH_2OH$, —$CH_2OR_8$ ($R_8$ to be defined later), though not all of $R_7$ are —H.

Examples of $R_1$, $R_2$, $R_3$, $R_4$, $R_5$ and $R_6$ are the same groups as defined above. Further, in the modified aliphatic ester-amide copolymers of the present invention, a part or all of the hydrogen atoms of amide groups are substituted with a alkoxymethyl and/or hydroxymethyl group. For example, the alkoxymethyl group is represented by the following formula (5):

$$—CH_2—O—R_8 \qquad (5)$$

wherein R8 represents a $C_{1-6}$ straight-chain alkyl group or a branched chain alkyl group in which a part, preferably one to two, of the hydrogen atoms of said straight-chain alkyl group is/are substituted with a methyl group. Examples of $R_8$ in the above formula are —$CH_3$ and —$CH_2CH_3$.

Examples of the alkoxymethyl group are methoxymethyl and ethoxymethyl.

Preferably in the modified aliphatic ester-amide copolymer of the present invention, the upper limit on the ratio of the amide units to all the units is about 80 mol %. When the ratio of the amide units exceeds about 80 mol %, the resin is not likely to be microbiologically degraded or disintegrated any more. The disintegration here means that the configuration of resin is broken down by microbes into resin fragments mainly constituted of amide units which are stable to microbes. For complete degradation by microbes at a molecular level (referred to as complete biodegradation hereafter), the upper limit on the ratio of the amide units is preferably about 70 mol %, more preferably about 60 mol %. The lower limit is about 10 mol %. When the ratio of the amide units is below about 10 mol %, the amount of alkoxymethyl in the modified aliphatic ester-amide copolymer is so small that the copolymer cannot be dissolved singly in the organic solvent. Generally, since raw material compounds for the ester unit are more expensive than those for the amide unit, a completely biodegradable resin is more expensive. The copolymer may be aptly made biodisintegrable or completely biodegradable, depending on application requirements and cost requirements.

The aliphatic ester-amide copolymers contain both ester and amide units on the polymeric main chain and characteristically the copolymer molecules thereof bond firmly to each other due to intermolecular force among the units. It is considered that, in the present invention, the hydrogen bond among the amide units is weakened by substituting a part or all of the hydrogen atoms of the amide groups with alkoxymethyl and/or hydroxymethyl groups, so that polymeric chain is dissolved in the organic solvent.

Additionally, when the intermolecular force among the ester units is strong, the resin is not dissolved, or it gels when mixed with a solvent such as lower alcohol, because the copolymer molecules hardly separate from each other at room temperature due to strong intermolecular force among the ester units. In this case, since the intermolecular force between the ester units can be more easily weakened by heating than that between the amide units, it is effective to heat when the modified copolymer can hardly be dissolved in a solvent.

In the modified aliphatic ester-amide copolymers of the present invention, the product of the ratio to all the amide units of amide units wherein the hydrogen atoms of the amide groups are substituted by alkoxymethyl and/or hydroxymethyl groups (referred to as the substituted amide ratio hereafter) and the molar ratio of all the amide units to all the units of the copolymer is preferably within the range from about 0.1 to about 0.6. When the substituted amide ratio is too high, the ratios of the unsubstituted amide units and the ester units become so low that the bond between the molecules is weakened and the resin loses its toughness for practical use. When the substituted amide ratio is too low, the solubility of the resin in an organic solvent such as a lower alcohol declines and the resin, if dissolved, can hardly be stable in a homogeneous state.

For finding the ratio of substituted amide units to all the units of the modified aliphatic ester-amide copolymer of the present invention, for example, the modified aliphatic ester-amide copolymer can be treated in an aqueous solution of an inorganic strong acid such as hydrochloric acid for a long time to liberate and remove alkoxymethyl and/or hydroxymethyl groups completely, thereby the ratio being calculated from the change in weight; the ratio can also be calculated from changes in ratios of carbon and oxygen to nitrogen using the elemental analysis; and the ratio can be calculated by the $^1$H- and $^{13}$C-NMR method.

Preferably, the degree of the substitution with alkoxymethyl and/or hydroxymethyl groups in the modified aliphatic ester-amide copolymer of the present invention is such a degree as the peak attributable to crystalline amide groups on the differential scanning calorimetry (DSC) chart shifts to a lower temperature than that of its basic unmodified resin, i.e., the resin in which the substitution with alkoxymethyl and/or hydroxymethyl groups is not executed, or disappears. Preferably the peak shifts to a temperature lower by 10° C. or more than that of the unmodified resin. The higher the substitution degree, the more the peak shifts and the broader the peak becomes, finally the peak disappearing. Substitution in such a degree as no changes are observed on DSC chart cannot improve the solubility in a solvent such as a lower alcohol adequately, so that the effect of the present invention cannot be obtained.

The change of the peak attributable to the crystalline amide groups on DSC chart can be observed by comparison not only with DSC chart for the basic unmodified resin but also with that for the above described acid-treated resin obtained from the modified aliphatic ester-amide copolymer by removing the alkoxymethyl and/or hydroxymethyl groups therefrom.

In the unmodified aliphatic ester-amide copolymer, the peak attributable to the crystalline amide groups on DSC chart is observed at almost the same temperature as that of the homopolymer of the amide units (for example, around 215° C. for poly ε-caprolactam), while, for a random ester-amide copolymer, the peak attributable to the amide units observed at a lower temperature. The more the randomization, the broader the peak, so that the peak is not observed clearly. In a further randomization, change of the peak of modified copolymer may be observed in a decline in heat absorption at higher temperatures of the broad peak in addition to a shift of the whole peak.

The modified aliphatic ester-amide copolymer, as the changes on DSC chart at high temperatures show (for example, see FIGS. 2 to 4), can be molded at lower temperatures and its thermal molding is easy.

The modified aliphatic ester-amide copolymer of the present invention may be block copolymer, graft copolymer or alternative copolymer.

The copolymers of the present invention may include a structure resulted from a chain extender such as diisocyanate and polybasic acid which is added in a small amount for the purpose of bonding polymers for further polymerization.

The weight-average molecular weight of the modified aliphatic ester-amide copolymer is preferably from about 1,000 to about 500,000. The aliphatic ester-amide copolymer, with a weight-average molecular weight of about 1,000 or more, exhibit good properties in reprecipitated polymer and can be used for general purpose. The aliphatic ester-amide copolymer, with a weight-average molecular weight of about 500,000 or below, can be synthesized in a relatively short time and the reaction conditions such as the degree of vacuum can be eased. In these modified copolymers, since the toughness of the aliphatic amide groups tends to decline as the degree of modification becomes higher, the weight-average molecular weight is more preferably from 5,000 to 200,000, specifically 15,000; 20,000; 25,000; 30,000; 40,000; 50,000; 100,000; and 150,000.

The modified aliphatic ester-amide copolymer of the present invention may include a resin formed as a byproduct in the substitution of the hydrogen atoms of the amide groups with alkoxymethyl and/or hydroxy methyl groups wherein the hydrogen atoms of the amide groups are substituted with a group represented by the following formula:

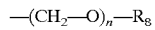

wherein $R_8$ is the same as defined above and n is an integer from 2 to 10) and a resin which has a structure wherein 2 or more molecules are bonded by crosslinked alkoxymethyl and/or hydroxymethyl groups.

The modified aliphatic ester-amide copolymer of the present invention can be prepared by modification of a pre-produced aliphatic ester-amide copolymer, that is, substitution of a part or all of the hydrogen atoms of the amide groups thereof with alkoxymethyl and/or hydroxymethyl groups.

For preparing an aliphatic ester-amide copolymer, any of the conventionally known methods can be used, for example, a method comprising a ring-opening copolymerization of lactone and lactam with an alkali metal as a polymerization initiator (as described in Eur. Polym. J. vol.20, No.6, pp529–536, pp539–547 and pp549–557 (1984) and Japanese Unexamined Patent Publication No. JP-06-A-200016); a method comprising a mixing of an aliphatic polyester and aliphatic polyamide in a molten state and a subsequent copolymerization using the ester-amide interchange reaction (as described in Japanese Examined Patent Publication No. JP-56-B-38115); and a method comprising a polycondensation of amino carboxylic acid, dicarboxylic acid and diamine with lactone (as described in Japanese Unexamined Patent Publication No. JP-05-A-156008).

For modification of the aliphatic ester-amide copolymer thus obtained, a similar method to the N-alkoxymethyl modification of polyamide can be used. That is, the modification can be executed by reacting an aliphatic ester-amide copolymer, an alcohol such as methanol, ethanol and isopropanol, and an excess of formaldehyde at a high temperature in the presence of an acid catalyst such as phosphoric acid; and by adding a formaldehyde or paraformaldehyde solution in methanol to the aliphatic ester-amide copolymer solution in formic acid or the like to react them at room temperature (as described in U.S. Pat. No. 2430680 and Japanese Examined Patent Publication No. JP-48-B-16997.

In the former case, in addition to phosphoric acid, an organic acid such as formic acid, an ester or salt thereof can also be used as a catalyst (as described in Japanese Examined Patent Publication No. JP-53-B-30692). Also, water (about 10%) can be added to the alcohol and formaldehyde so that the resin can be homogeneously dispersed in the form of flakes or particles for enabling a more effective washing of the resin.

In the latter case, a mixture of formic acid and acetic acid can be used for the purpose of inhibiting the molecular weight from declining in the reaction, in addition to formic acid (as described in Japanese Examined Patent Publication No. JP-43-B-10636).

Further, the present invention provides a composition comprising an aliphatic ester-amide copolymer an inorganic metal salt.

The inorganic metal salt used in the present invention is preferably a halide, nitrate and thiocyanate of a metal selecting from the groups Ia, IIa, Ib and IIb of the periodic table. They may be used singly or as a combination thereof. Examples of the preferable metal are lithium, sodium, potassium, magnesium, calcium, strontium and zinc.

Examples of the inorganic metal salt are lithium chloride, calcium chloride, magnesium chloride, zinc chloride, lithium bromide, calcium bromide, magnesium bromide, zinc bromide, calcium nitrate, magnesium nitrate, zinc nitrate or lithium thiocyanate.

The aliphatic ester-amide copolymer of the present invention includes both ester and amide units on a polymeric main chain and characteristically the molecules thereof unite positively to each other by the intermolecular force between both units. It is considered that, in the aliphatic ester-amide copolymer, the polymeric main chain is dissolved in the above mentioned solvent of the inorganic salt in the organic solvent due to the intermolecular force between the amide units loosened by the solvent.

When the force between the ester units is strong, the ester units on the polymeric main chain can hardly be separated at room temperature so that sometimes the composition of the copolymer is not homogeneously dispersed or gels. However, the intermolecular force between the ester units can be more easily weakened than that between the amide units with heating and the solution state can be kept.

Other groups of the aliphatic ester-amide copolymers may include any resins wherein ester and amide are copolymerized. Considering the polimerizability, material costs and the like, the copolymer is preferably a resin wherein an ester unit represented by the following formulae (1) and/or (2):

—O—R$_1$—CO—       (1)

wherein R$_1$ represents the same as defined above,

—O—R$_2$—OCO—R$_3$—CO—       (2)

wherein R$_2$ and R$_3$ represent the same as defined above, and an amide unit represented by the following formulae (3) and/or (4):

—NH—R$_4$—CO—       (3)

wherein R$_4$ represents the same as defined above,

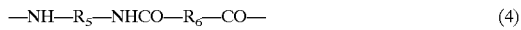
—NH—R$_5$—NHCO—R$_6$—CO—       (4)

wherein R$_5$ and R$_6$ represent the same as defined above, are copolymerized. The conventional, block, graft or alternative copolymerization may be used. The aliphatic ester-amide copolymer of the present invention may contain a structure resulted from a chain extender such as diisocyanate, a polybasic acid and the like which is added in a small amount for the purpose of bonding polymers for further polymerization.

Examples of the above R$_1$, R$_2$, R$_3$, R$_4$, R$_5$ and R$_6$ are the same as already defined above.

The weight-average molecular weight of the aliphatic ester-amide copolymer is preferably within the range from about 1,000 to about 500,000. The copolymer, with a weight-average molecular weight of about 1,000 or more, has good properties in reprecipitated polymer and can be used for general purpose. The copolymer, with a weight-average molecular weight of about 500,000 or below, can be synthesized in a relatively short time and the reaction conditions such as the degree of vacuum can be eased. Since the composition of the aliphatic ester-amide copolymer contains the inorganic metal salt, the toughness of the resin tends to decline depending on the content thereof. For compensating the decline, the weight-average molecular weight is more preferably from about 5,000 to about 200,000, specifically 15,000; 20,000; 25,000; 30,000; 40,000; 50,000; 100,000; and 150,000.

The present invention also provides a solution of the aliphatic ester-amide copolymer in the above-described organic solvent which does not harm the human body. The resin solution can be used as an adhesive as it is.

The mixing ratio of the organic solvent, inorganic metal salt and the aliphatic ester-amide copolymer in the solution of the present invention is preferably from about 1 to about 40 parts by weight, more preferably from about 1 to about 30 parts by weight of the inorganic metal salt, and about 1 to about 40 parts by weight, more preferably from about 1 to about 30 parts by weight of the copolymer to 100 parts by weight of the organic solvent. When the mixing ratios for the inorganic metal salt and the copolymer are smaller than the above range, less copolymer reprecipitates. When they are larger than the above range, the inorganic metal salt and/or copolymer are likely to separate so that it is hard to obtain a homogeneous solution or mixture.

In addition to the organic solvent, the inorganic metal salt and the aliphatic ester-amide copolymer, the solution of the copolymer of the invention may contain a surfactant, antioxidant, plasticizer or the like for increasing the stability of the solution or improving the reprecipitated resin. Also it may contain a dye, a pigment or the like for dyeing the reprecipitated resin.

Water of crystallization contained in the inorganic metal salt can be remained in the mixture, but its content should be controlled within such a range that the resin does not separate in accordance with usage. The dissolution is preferably conducted with heating. Heating can accelerate the dissolution of the aliphatic ester-amide copolymer. The heating temperature preferably does not exceed the boiling point of the organic solvent because a pressure container or the like is not required for heating.

By removing the organic solvent from the above solution of the aliphatic ester-amide copolymer, an aliphatic ester-amide copolymer the configuration of which is changed, or a composition thereof can be easily obtained.

For such reprecipitation of the aliphatic ester-amide copolymer from the resin mixture in the form of solution, the organic solvent and/or inorganic metal salt can be removed from the mixture. Specifically, the resin mixture can be made into a certain configuration by applying, dipping, pouring or the like and then reprecipitated in another configuration by an easy step such as drying, water-cleaning and the like.

As described in the later Test Examples, the aliphatic ester-amide copolymer composition can be made into, for example, a film, porous film, a molded material, a porous molded material, particles and porous particles by changing its configuration with removing the organic solvent. Such a composition can be used for coating of granular fertilizer and coating of granular fertilizer with a porous film. Such a fertilizer has an excellent slow-effect, and, when used with the biodegradable aliphatic ester-amide copolymer composition, it has a remarkable industrial advantage since it is biodegradable in soil after use.

Therefore, according to the invention wherein the organic solvent which not toxic or harmful to the environment can be used, the biodegradable resin can be easily used for application or coating, which is conventionally difficult. Further the slow-effective fertilizer using the aliphatic ester-amide copolymer of the invention without an inorganic metal salt can act as an effective fertilizer for a plant which is easily affected by a salt.

The weight-average molecular weight was measured by means of GPC apparatus manufacture by Tosoh Corporation, Japan (Model HLC-8020) provided with GPC column manufactured by the same (Article No. TSKgel GMHHR-M) with the column temperature at 40° C. under a pressure of 50 kg/cm2 with a flow of a solution of trifluoroacetic acid at a concentration of 10 mMol/l in hexafluoroisopropanol (HFIP) manufactured by Central Glass Co., Ltd., Japan at a flow rate of 0.5 ml/min as an eluting solution. A standard sample for GPC of polymethylmethacrylate manufactured by Showa Denko K.K., Japan was used. The ratio of amide units in the copolymer was measured with FT-IR apparatus manufactured by Nicolet.

The present invention will hereinafter be described in detail by way of embodiments thereof, wherein ε-caprolactam manufactured by Mitsubishi Chemical Corporation, Japan was used for ε-caprolactam and "PLACCEL M" manufactured by Daicel Chemical Industries, Japan was used for ε-caprolactone; the soil used was collected at the plant site located in Tenri-city, Nara, Japan and sieved with a 1.7 mm screen; and part or parts means part or parts by weight unless specifically indicated. These embodiments are not intended to limit the present invention.

TEST EXAMPLE 1

ε-Caprolactam (16.9 g) was fed in a separable glass flask and dried with heating to 130° C. for 90 minutes, followed by addition of 70 mg of sodium. The temperature of the mixture was raised to 170° C. After addition of 17.1 g of ε-caprolatone in 20 minutes, the mixture was allowed to react with stirring for 60 minutes. Unreacted materials were removed under a reduced pressure of 10 mmHg or below at 180° C. for 60 minutes. An aliphatic ester-amide copolymer with an amide unit ratio of 50 mol % and a weight-average molecular weight of 8,900 was obtained.

The above copolymer (5 parts) was added to 100 parts of methanol and stirred for 6 hours while maintained at 30° C., thereby obtaining a translucent resin mixture wherein the resin components were homogeneously dissolved. The mixture, heated to 60° C., became a transparent resin solution.

A sheet of copper was dipped in the above resin solution and then dried. A translucent resin coating was formed on the surface of the copper sheet. The coated copper sheet was allowed to stand for a week. Nothing unusual such as corrosion was observed on the surface of the copper sheet.

A sheet of glass similarly coated with the resin was buried at a depth of 10 mm from the surface in a laboratory dish filled with the soil. The dish was allowed to stand in an incubator at 30° C. with the water content in the soil maintained at 50% to the maximum amount of water that the soil could contain. One month later, most of the coating had disappeared and black fungus were seen attaching to the surface of the remaining film. Examination of the surface with a scanning electron microscope showed that the resin around mycelia of the fungus had disappeared.

TEST EXAMPLE 2

ε-Caprolactam (16.9 g) was fed in a separable glass flask and dried with heating to 130° C. for 90 minutes, followed by addition of 140 mg of sodium. The temperature of the mixture was raised to 170° C. To the mixture, 17.1 g of ε-Caprolatone was once added and the mixture was allowed to react with stirring for 60 minutes. Unreacted materials were removed under a reduced pressure of 10 mmHg or below at 180° C. for 60 minutes. An aliphatic ester-amide copolymer with an amide unit ratio of 45 mol % and an weight-average molecular weight of 4,500 was obtained.

The above copolymer (5 parts) was added to 100 parts of methanol and stirred for 6 hours while maintained at 30° C., thereby obtaining a transparent resin mixture wherein the resin components were homogeneously dispersed. The mixture, heated to 60° C., became a transparent resin solution.

A sheet of copper was dipped in the above resin mixture and then dried. An almost transparent resin coating film was formed on the surface of the copper sheet. The coated copper sheet was allowed to stand for a week. Nothing unusual such as corrosion was observed on the surface of the copper sheet.

A sheet of glass coated similarly with the resin was buried at a depth of 10 mm from the surface in a laboratory dish filled with the soil. The dish was allowed in the incubator at 30° C. with the water content in the soil maintained at 50% to the maximum amount of water that the soil could contain. One month later, most of the coating had disappeared and black fungus were seen attaching to the surface of the remaining coating. Examination of the surface by the scanning electron microscope showed that the resin around mycelia of the fungus had disappeared.

From the above two examples, it was confirmed that the aliphatic ester-amide copolymer with a weight-average molecular weight from about 1,000 to about 10,000 was soluble in an organic solvent which was not harmful to the human body without using any inorganic metal salt. It was also confirmed that the aliphatic ester-amide copolymer having aliphatic amide units at a ratio from about 10 to about 80 mol % exhibited biodegradability in soil.

TEST EXAMPLE 3

ε-Caprolactam (40 parts) was fed in a polymerizer and dried at 130° C. with a flow of nitrogen for 90 minutes, followed by addition of 0.08 parts of sodium. The temperature of the mixture was raised to 170° C. with stirring. After addition of 60 parts of ε-caprolatone, the mixture was copolymerized with further stirring for 60 minutes. Then the volatile substances such as unreacted monomers in the polymerizer were removed under reduced pressure, thereby obtaining an aliphatic ester-amide copolymer. The obtained copolymer was opaque and white, having an amide unit ratio of 30 mol % and a weight-average molecular weight of 14,000. The copolymer (30 g) was dissolved in 30 g of formic acid to form a solution.

Paraformaldehyde (5 g), methanol (5 g) and sodium hydroxide (40 mg) were mixed to form a solution, which was mixed with the above copolymer solution in formic acid with heating to 60° C. After 10 minutes, 7 g of methanol was added to the obtained solution, which was allowed to react with stirring for another 30 minutes.

The obtained resin solution is poured into a mixed solvent of water and acetone at a mixing ratio of 1:1 to precipitate a part of the resin. Then on adjusting the solution to pH9 with ammonia water, a large amount of viscous resin precipitated. After continuous stirring for 3 hours, the precipitated resin was washed with water to complete the solidification, and then it was ground, filtered and dried. The obtained N-methoxymethyl-modified copolymer was light-brownish flaky resin which was soluble in methanol and ethanol.

The ratio of aliphatic amide units substituted with N-methoxymethyl to the whole units on the main chain was measured by mixing the obtained modified copolymer with 5% aqueous solution of hydrochloric acid and liberating methoxymethyl groups of the resin. The ratio was 0.25.

Figure 2:
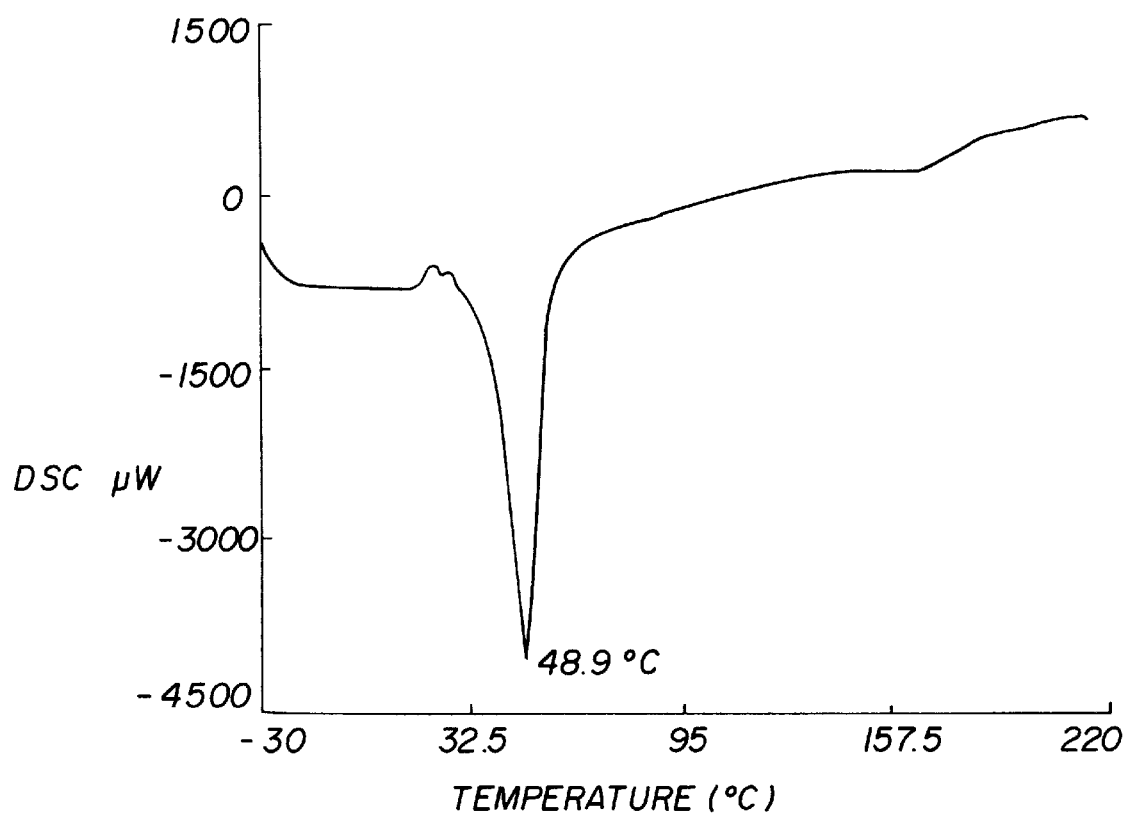
FIG. 2 shows a DSC chart of an aliphatic ester-amide copolymer modified with methoxymethyl in accordance with the present invention.

DSC charts for the resin was obtained before and after the modification by means of DSC-200 type DSC apparatus manufactured by Seiko Electronics with a flow of nitrogen with heating at a rate of 10 °C./min. The results are shown in FIGS. 1 and 2. The peak attributable to the amide structure observed around 214° C. in FIG. 1 turned into a broad peak around 150° C. and was hardly seen in FIG. 2. The weight-average molecular weight after the modification, 13,000, was almost the same as before the modification.

The above modified copolymer (30 parts) was added to 100 parts of ethanol and stirred with heating to about 50° C. A translucent viscous solution was obtained. The obtained resin solution was uniformly spread on a flat glass sheet and gradually dried at room temperature. A flexible translucent film was formed.

The obtained film (being about 0.1 mm in thickness) was buried at a depth of 10 mm from the surface in a laboratory dish filled with the soil. The dish was allowed to stand in the incubator at 30° C. with the water content in the soil maintained at 50% to the maximum amount of water that the soil could contain. One month later, the film collapsed and a part of the film had disappeared. Black fungus were also seen attaching to the surface of the remaining resin and examination of the surface with the scanning electron microscope showed that mycelia of the fungus and the resin therearound had disappeared.

TEST EXAMPLE 4

εCaprolactam (60 parts) was fed in a polymerizer and dried at 130° C. with a flow of nitrogen for 90 minutes, followed by addition of 0.08 parts of sodium. The temperature was raised to 200° C. with stirring. After addition of 40 parts of ε-caprolatone, the mixture was copolymerized with further stirring for 30 minutes. Then the volatile substances such as unreacted monomers in the polymerizer were removed under reduced pressure, thereby obtaining an aliphatic ester-amide copolymer. The obtained copolymer was pale-yellowish and translucent, having a amide unit ratio of 60 mol % and a weight-average molecular weight of 13,000. The copolymer (20 g) was dissolved in a mixture of formic acid (20 g) and acetic acid (10 g) to form a solution.

The above copolymer solution in formic and acetic acids was mixed with heating to 60° C. to a solution of paraformaldehyde (10 g), methanol (10 g) and sodium hydroxide (80 mg). After 10 minutes, about 10 g of methanol was added to the obtained solution, which was allowed to react with stirring for another 30 minutes.

The obtained resin solution was poured into a mixed solvent of water and acetone (1:1) to precipitate a part of the resin. Then on adjusting of the solution to about pH8 with ammonia water, a large amount of resin precipitated. The precipitated resin was dispersed in the form of fragments. After continuous stirring for 6 hours, the resin solidified in the form of fragments. Then the solidified resin was separated and dried. The obtained N-methoxymethyl-modified copolymer was light-brownish particle resin which was soluble in methanol and ethanol.

The ratio of aliphatic amide units substituted with N-methoxymethyl to the whole units on the main chain is measured by mixing the obtained modified copolymer with 5% aqueous solution of hydrochloric acid and liberating methoxymethyl groups of the resin. The ratio was 0.42.

Figure 3:
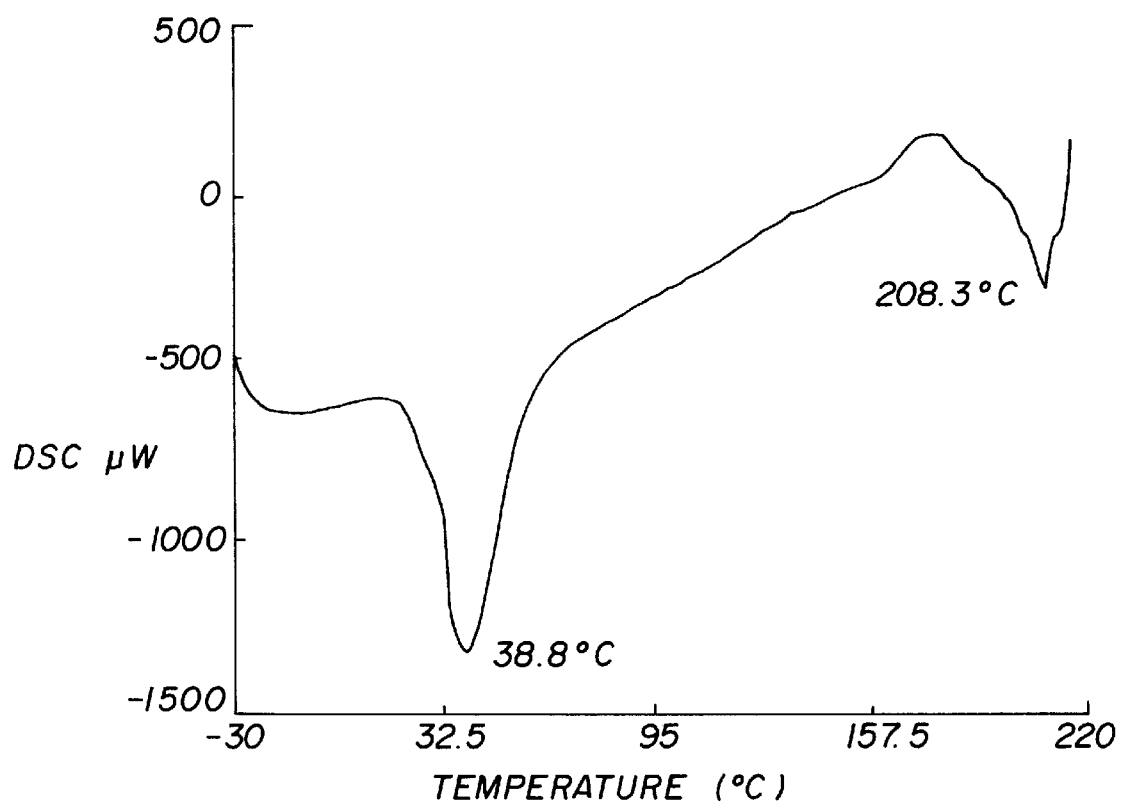
FIG. 3 shows a DSC chart of an unmodified aliphatic ester-amide copolymer of the present invention.
Figure 4:
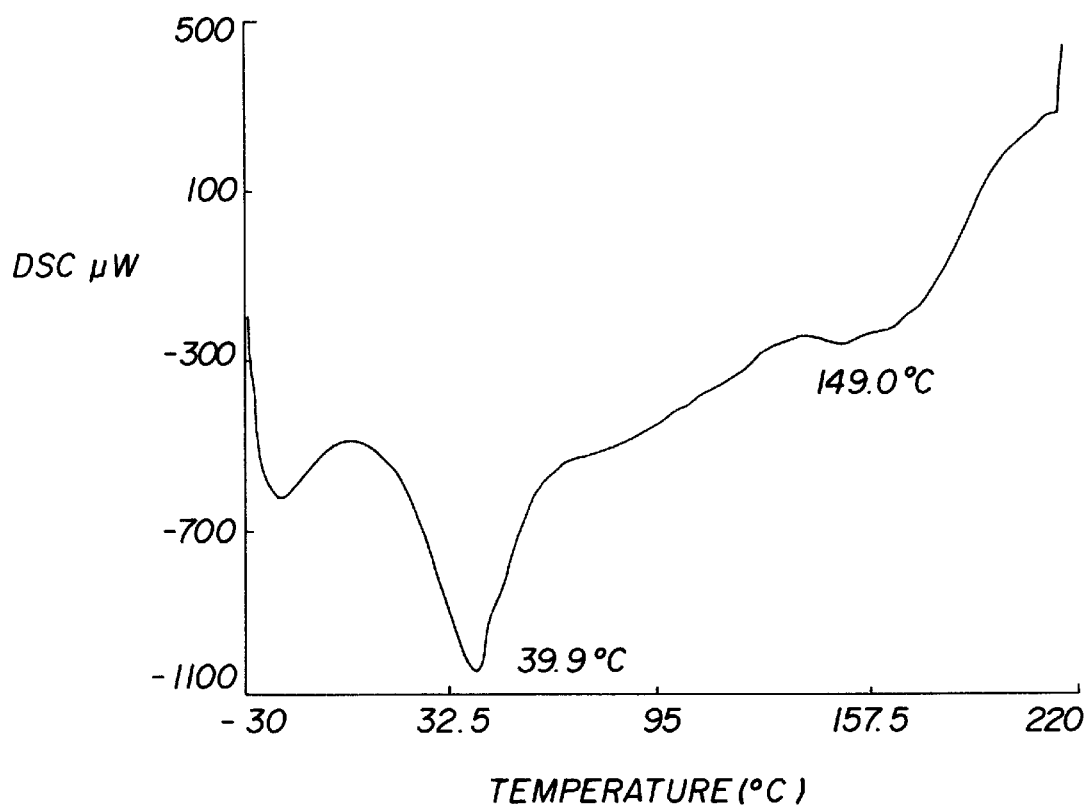
FIG. 4 shows a DSC chart of an aliphatic ester-amide copolymer modified with methoxymethyl in accordance with the present invention.

DSC charts for the resin was obtained before and after the modification in the manner as described in Test Example 3. The results are shown in FIGS. 3 and 4. The sharp peak attributable to the amide structure observed around 208° C. in FIG. 3 turned into a broad vague peak between 140° and 180° C. in FIG. 4. The weight-average molecular weight after the modification, 13,000, was almost the same as before the modification.

The above modified copolymer (30 parts) was added to 100 parts of ethanol and stirred with heating to about 50° C., thereby obtaining a translucent pale-yellowish viscous solution. The solution was uniformly spread on a flat glass sheet and gradually dried at room temperature. A flexible translucent film was formed.

The obtained film (being about 0.1 mm in thickness) was buried at a depth of 10 mm from the surface in a laboratory dish filled with the soil. The dish was allowed to stand in the incubator at 30° C. with the water content in the soil maintained at 50% to the maximum amount of water that the soil could contain. One month later, a part of the film collapsed and black fungus were seen attaching to the surface of the resin. Examination of the surface with the scanning electron microscope showed that mycelia of the fungus and the resin therearound were destroyed and a part of the film had disappeared.

TEST EXAMPLE 5

ε-Caprolactam (75 parts) was fed in a polymerizer and dried at 130° C. with a flow of nitrogen for 90 minutes, followed by addition of 0.06 parts of sodium. The temperature was raised to 230° C. with stirring. After addition of 25 parts of ε-caprolatone, the mixture was copolymerized with further stirring for 40 minutes. Then the volatile substances such as unreacted monomers in the polymerizer were removed under reduced pressure, thereby obtaining an aliphatic ester-amide copolymer. The obtained copolymer was pale-yellowish and opaque, having an amide unit ratio of 85 mol % and a weight-average molecular weight of 21,000. The copolymer (15 g) was dissolved in 20 g of formic acid to form a solution.

The above copolymer solution in formic acid was mixed with heating to 60° C. with a solution of paraformaldehyde (15 g), methanol (15 g) and sodium hydroxide (80 mg). After 10 minutes, about 10 g of methanol was added to the obtained mixture, which was allowed to react with stirring for another 30 minutes.

The obtained copolymer solution was poured into a mixed solvent of water and acetone (1:1) to precipitate a part of the resin. Then on adjusting of the solution to about pH8 with ammonia water, a large amount of resin precipitated in the form of fragments. After continuous stirring for 6 hours, the precipitated resin was washed with water, and then it was ground, filtered and dried. The obtained N-methoxymethyl-modified copolymer was a brownish flaky resin which was soluble in methanol and ethanol. The weight-average molecular weight after the modification was 22,000.

The ratio of aliphatic amide units substituted with N-methoxymethyl to the whole units on the main chain was measured by mixing the obtained modified copolymer with 5% aqueous solution of hydrochloric acid and liberating methoxymethyl groups of the resin. The ratio was 0.43.

The above modified copolymer (30 parts) was added to 100 parts of ethanol and stirred with heating to about 50° C. A translucent pale-yellowish viscous solution was obtained. The solution was uniformly spread on a flat glass sheet and gradually dried at room temperature. A flexible translucent film was formed.

The obtained film (being about 0.1 mm in thickness) was buried at a depth of 10 mm from the surface in a laboratory dish filled with the soil. The dish was allowed to stand in the incubator at 30° C. with the water content in the soil maintained at 50% to the maximum amount of water that the soil could contain. One month later, little damage was seen with the film. Although a few black fungus were seen attaching to the surface of the resin, examination of the surface with the scanning electron microscope showed no destruction or disappearance of the resin around mycelia of the fungus.

From the above examples, it was confirmed that the modified aliphatic ester-amide copolymers obtained by substituting a part or all of the hydrogen atoms of the aliphatic amide groups of the copolymer with hydroxymethyl and/or alkoxymethyl groups were soluble in an organic solvent which was not harmful to the human body without using any inorganic metal salt. Also it was observed that the aliphatic ester-amide copolymers having aliphatic amide units at a ratio from about 10 to about 80 mol % exhibited biodegradability in soil.

TEST EXAMPLE 6

Calcium chloride anhydride (20 parts) was completely dissolved in 100 parts of methanol with mixing and stirring to form a transparent solvent. Added to the solvent were 20 parts of an ester-amide copolymer (the weight-average molecular weight being 15,000 and the ratio of amide units being 25 mol %) obtained by ring-opening copolymerization of ε-caprolactam and ε-caprolactone. By stirring with heating to 60° C. for 1 hour, the resin components were homogeneously dispersed and a transparent resin solution was obtained. The solution, allowed to stand at room temperature, became homogeneous white paste.

The resin paste was heated to 60° C., applied on a flat glass sheet and dried. A white resin film was formed. The film, together with the glass sheet, was dipped in water for removing the inorganic metal salt and dried. A white resin film in adhesion to the glass surface was obtained.

The above glass sheet coated with the resin was buried at a depth of 10 mm from the surface in a laboratory dish filled with the soil. The dish was allowed to stand in the incubator at 30° C. with the water content in the soil maintained at about 50%. One month later, black fungus were seen attaching to the surface of the resin and a part of the film had disappeared. Examination of the surface with the scanning electron microscope showed that resin around mycelia of the fungus had disappeared.

TEST EXAMPLE 7

A milky resin mixture with the resin components homogeneously dispersed therein was obtained as described in Test Example 6 except that the stirring was executed for 6 hours at room temperature instead of heating to 60° C. The obtained resin mixture, when heated to 60° C., became an almost transparent resin solution.

TEST EXAMPLE 8

Lithium bromide (10 parts) was completely dissolved in 100 parts of methanol with mixing and stirring to form a transparent solvent. To the solvent, 10 parts of the aliphatic ester-amide copolymer as described in Test Example 6 were added. By stirring at room temperature for 6 hours, a milky resin mixture with the resin components homogeneously dispersed therein was obtained. The resin mixture, when heated to 60° C., become an almost transparent resin solution, and, when allowed to stand at room temperature, a part of the resin precipitated at the bottom of the container. The mixture was heated to 60° C., applied on a flat glass sheet and dried. A white resin film was formed.

TEST EXAMPLE 9

Zinc bromide (10 parts) was completely dissolved in 100 parts of methanol with mixing and stirring to form a transparent solvent. To the solvent, 10 parts of the aliphatic ester-amide copolymer as described in Test Example 6 were added. By stirring at room temperature for 6 hours, a milky resin mixture with the resin components homogeneously dispersed therein was obtained. The resin mixture, when heated to 60° C., became an almost transparent resin solution and, when allowed to stand at room temperature, a part of the resin precipitated at the bottom of the container. The mixture was heated to 60° C., applied on a flat glass sheet and dried. A white resin film was formed.

TEST EXAMPLE 10

Calcium nitrate tetrahydrate (10 parts) was completely dissolved in 100 parts of methanol with mixing and stirring to form a transparent solvent. To the solvent, 10 parts of the aliphatic ester-amide copolymer as described in Test Example 6 were added. By stirring at room temperature for 6 hours, a milky resin mixture with the resin components homogeneously dispersed therein was obtained. The mixture, when heated to 60° C., became an almost transparent resin solution and, when allowed to stand at room temperature, a part of the resin precipitated at the bottom of the container. The mixture was heated to 60° C., applied on a flat glass sheet and dried. A white resin film was formed. The film, together with the glass sheet, was dipped in water for removing the inorganic metal salt and dried. A white resin film excellent in adhesion to the glass surface was obtained.

TEST EXAMPLE 11

Calcium chloride anhydride (10 parts) was completely dissolved in 100 parts of ethanol with mixing and stirring to form a transparent solvent. To the solvent, 5 parts of the aliphatic ester-amide copolymer as described in Test Example 6 were added. By stirring at room temperature for 3 hours, a transparent resin mixture with the resin components homogeneously dispersed therein was obtained. The mixture was applied on a flat glass sheet and dried. A white resin film was formed. The film, together with the glass sheet, was dipped in water for washing the inorganic metal salt and dried. A white resin film excellent in adhesion to the glass surface was obtained.

TEST EXAMPLE 12

Lithium chloride (10 parts) was completely dissolved in 100 parts of ethanol with mixing and stirring to form a transparent solvent. To the solvent, 10 parts of the aliphatic ester-amide copolymer as described in Test Example 6 were added. By stirring at room temperature for 6 hours, a milky resin mixture with the resin components homogeneously dispersed therein was obtained. The mixture, when heated to 60° C., became an almost transparent resin solution and, when allowed to stand at room temperature, a part of the resin precipitated in gel. The mixture, heated to 60° C., was applied on a flat glass sheet and dried. A white resin film was formed.

TEST EXAMPLE 13

Calcium chloride (10 parts) was completely dissolved in 100 parts of 2-ethoxyethanol with mixing and stirring to form a transparent solvent. To the solvent, 10 parts of the aliphatic ester-amide copolymer as described in Test Example 6 were added. By stirring at room temperature for 6 hours, a milky resin mixture with the resin components homogeneously dispersed therein was obtained. The mixture, when heated to 60° C., became an almost transparent resin solution and, when allowed to stand at room temperature, no precipitation of the resin was observed. The mixture, heated to 60° C., was applied on a flat glass sheet and dried. A white resin film was formed.

TEST EXAMPLE 14

Zinc chloride (5 parts) was completely dissolved in 100 parts of 2-methoxyethanol with mixing and stirring to form a transparent solvent. To the solvent, 5 parts of the aliphatic ester-amide copolymer as described in Test Example 6 were added. By stirring at room temperature for 6 hours, a milky resin mixture with the resin components homogeneously dispersed therein was obtained. The mixture, when heated to 60° C., became an almost transparent resin solution and, when the mixture was allowed to stand at room temperature, no precipitation of the resin was observed. The mixture, heated to 60° C., was applied on a flat glass sheet and dried. A white resin film was formed.

TEST EXAMPLE 15

Calcium chloride (10 parts) was completely dissolved in 100 parts of anhydrous acetic acid with mixing and stirring to form a transparent solvent. To the solvent, 10 parts of the aliphatic ester-amide copolymer as described in Test Example 6 were added. By stirring at room temperature for 6 hours, a transparent resin mixture with the resin components homogeneously dissolved therein was obtained. When the mixture was allowed to stand at room temperature, no precipitation of the resin was observed. The mixture was applied on a flat glass sheet and dried. A white resin film was formed.

TEST EXAMPLE 16

Calcium chloride (10 parts) was completely dissolved in 100 parts of methanol with mixing and stirring to form a transparent solvent. Added to the solvent were 10 parts of an aliphatic ester-amide copolymer (the weight-average molecular weight being 12,000 and the ratio of amide units being about 20 mol %) obtained by ring-opening copolymerization of ε-caprolactone and α-pyrrolidone. By stirring for 4 hours with maintaining 30° C., a milk-white resin mixture with the resin components homogeneously dispersed therein was obtained. When the mixture was heated to 60° C., it became an almost transparent resin solution. The mixture was applied on a flat glass sheet and dried. A white resin film was formed.

Comparative Example 1

Polycaprolactone (1 part) ("PLACCEL H7" manufactured by Daicel Chemical Industries, Japan), which is an aliphatic polyester with a weight-average molecular weight of 40,000, was added to 100 parts of the solvent prepared as described in Test Example 6. In spite of stirring for 6 hours with maintaining 30° C., homogeneous dispersion of the resin components was not achieved, and when allowed to stand, most of the resin components precipitated. When the mixture was heated to 60° C., the resin melted but was not dissolved or dispersed in the solvent.

From the above, it was confirmed that the aliphatic ester-amide copolymers containing the inorganic metal salts could be dissolved or dispersed in the organic solvents which were not harmful to the human body. It was also confirmed that the aliphatic ester-amide copolymers having aliphatic amide units at a ratio from about 10 to about 80 mol % exhibited biodegradability in soil.

Further compositions of the aliphatic ester-amide copolymers will be described in detail with reference to test examples, wherein the configurations of the copolymers are changed by using the aliphatic ester-amide copolymer mixtures wherein the resins are dissolved in organic solvents which are not harmful to the human body and removing the inorganic solvents from the resin mixtures.

TEST EXAMPLE 17

ε-Caprolactone and ε-caprolactam were polymerized by ring-opening with metallic sodium as an initiator to prepare an aliphatic ester-amide copolymer with an amide unit ratio of 25% and a weight-average molecular weight of 25,000.

The obtained copolymer (25 parts) and calcium chloride (25 parts) were added to 100 parts of methanol, and dissolved with heating to about 60° C. with stirring to form a solution. The solution was dried at room temperature to evaporate the methanol, thereby a composition of the aliphatic ester-amide copolymer being obtained.

The obtained aliphatic ester-amide copolymer (1 g) was added to 10 g of an organic solvent of methanol and ethanol at a weight ratio of 50:50, and was dissolved with stirring to obtain a solution.

The obtained solution was applied on a flat glass sheet and, by evaporating the above organic solvent under a circumstance of low humidity (the relative humidity being about 30%), formed was a film with a thickness of 0.21 mm consisting of the aliphatic ester-amide copolymer. The obtained film was cut into a sample of 4×5 cm. The sample weighed 458 mg. The sample was allowed to stand in the laboratory (at a temperature of about 23° C. at a humidity from about 60 to about 80%) for a week. The weight thereof increased to 688 mg, which proved good moisture-absorption characteristics of the film.

Also the obtained film was buried at a depth of 10 mm from the soil surface in a container filled with the soil, and was allowed to stand in the incubator at 30° C. with the water content in the soil maintained at about 50%. One month later, black fungus were seen attaching to the surface of the resin and a part of the film had disappeared. Examination of the surface with the scanning electron microscope showed that the resin around mycelia of the fungus had disappeared.

TEST EXAMPLE 18

ε-Caprolactone and ε-caprolactam were polymerized by ring-opening with metallic sodium as an initiator to prepare an aliphatic ester-amide copolymer with an amide unit ratio of 25% and a weight-average molecular weight of 25,000.

The obtained copolymer (50 parts) and calcium chloride (50 parts) were kneaded at about 100° C. by means of a heating kneader (Labo Plastomil) to obtain a composition of the aliphatic ester-amide copolymer.

The obtained composition of the aliphatic ester-amide copolymer (10 g) was added to 10 g of methanol and dissolved with stirring to obtain a solution.

The obtained solution was poured into a circular container with a cross-shaped convex at the bottom. By evaporating the above organic solvent, a coaster with a thickness of 3.1 mm made of the composition of the aliphatic ester-amide copolymer was formed.

The coaster, as in Test Example 17, was buried at a depth of 10 mm from the soil surface, and was allowed to stand in the incubator at about 30° C. with the water content in the soil maintained at about 50%. One month later, black fungus were seen attaching to the surface of the resin and a part of the resin had disappeared. Examination of the surface with the scanning electron microscope showed that the resin around mycelia of the fungus had disappeared.

TEST EXAMPLE 19

ε-Caprolactone and ε-caprolactam were polymerized by ring-opening with metallic sodium as an initiator to obtain an aliphatic ester-amide copolymer with an amide unit ratio of 25 mol % and a weight-average molecular weight of 25,000. The resin was translucent and pale-yellow.

The obtained aliphatic ester-amide copolymer (25 parts) was completely dissolved in a solution of calcium chloride (25 parts) in methanol (100 parts) by stirring with heating to 60° C. The obtained resin mixture was viscous liquid with a little turbidity.

The resin mixture (4.4 g) was poured into a laboratory dish (with an inner diameter of 90 mm) with a flat bottom. By gradual evaporation of the alcohol at room temperature, a film was formed. The obtained film was translucent and, when the film was allowed to stand in the room, globules due to deliquenscence of calcium chloride were observed on the surface of the film. Deionized water was poured in the dish, which was then allowed to stand for an hour. The film became cloudy and easy to peel off the dish. The film peeled off the dish was again dipped in deionized water for 3 hours and dried. A sample with an average thickness of 100 μm cut out from the film had a bulk density of 0.46 g/cm³. Since the specific gravity of the aliphatic ester-amide copolymer was 1.14, the volume ratio was 2.47.

Figure 5:
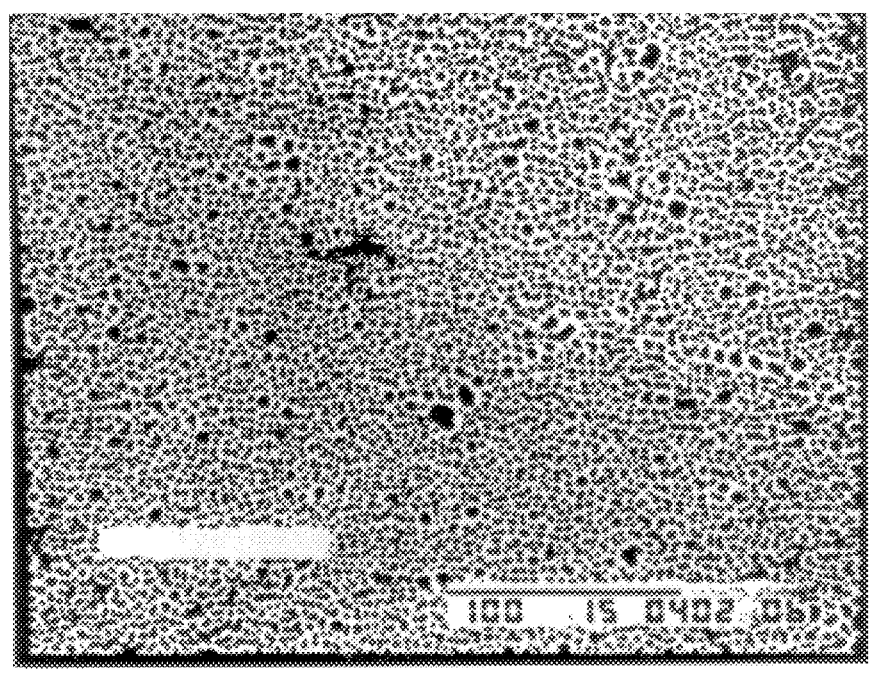
FIG. 5 shows a photograph of surface profile of the film obtained in Test Example 18 taken with a scanning electron microscope at a magnification of 350×.
Figure 6:
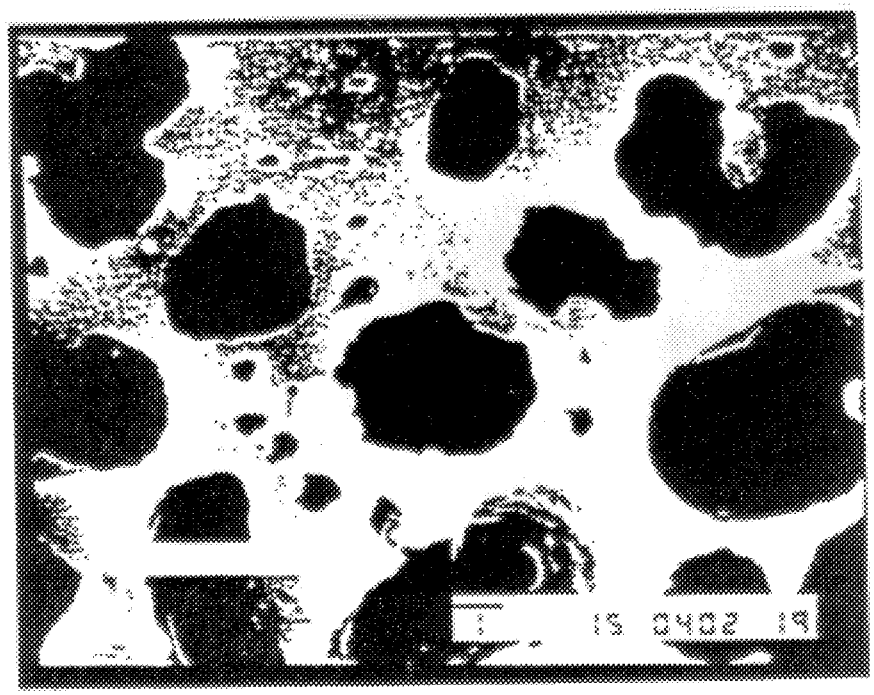
FIG. 6 shows a photograph of surface profile of the film obtained in Test Example 18 taken with a scanning electron microscope at a magnification of 7,500×.

Examination of the film with the scanning electron microscope showed that the film was homogeneously porous with a lot of micropores (with diameters from about 1 to about 10 μm) observed on the surface and in the inside. Photographs of the film surface with the scanning electron microscope are shown in FIGS. 5 (at a magnification of 350×) and 6 (at a magnification of 7,500×).

TEST EXAMPLE 20

ε-Caprolactone and ε-caprolactam were polymerized by ring-opening with metallic sodium as an initiator to obtain an aliphatic ester-amide copolymer with an amide unit ratio of 30 mol % and a weight-average molecular weight of 14,000.

The obtained aliphatic ester-amide copolymer (25 parts) was completely dissolved in a solution of calcium chloride (25 parts) in methanol (100 parts) by stirring with heating to 60° C. The obtained resin mixture was milky viscous liquid at 60° C., and lost its fluidity and solidified when allowed to stand at room temperature.

The resin mixture (4.4 g), homogenized by heating to 60° C., was poured into a laboratory dish (with an inner diameter of 90 mm) with a flat bottom. By gradual evaporation of the alcohol with heating to 60° C., a film was formed. Few cracks appeared during the formation of the film, which was homogeneous. When the film was allowed to stand in the room, globules due to deliquescence of calcium chloride were observed on the surface of the film. Deionized water was poured in the dish, which was allowed to stand for an hour. The film was easily peeled off the dish. The film peeled off the dish was again dipped in deionized water for 3 hours and dried. A sample with an average thickness of 370 μm cut out from the film had a bulk density of 0.49 g/cm³. Since the specific gravity of the aliphatic ester-amide copolymer was 1.14, the volume ratio was 2.33.

TEST EXAMPLE 21

ε-Caprolactone and ε-caprolactam were polymerized by ring-opening with metallic sodium as an initiator to obtain an aliphatic ester-amide copolymer with an amide unit ratio of 30 mol % and a weight-average molecular weight of 14,000.

The obtained aliphatic ester-amide copolymer (25 parts) was homogeneously dissolved in a solution of calcium chloride (25 parts) in methanol (100 parts) by stirring with heating to 60° C. The obtained resin mixture was milky viscous liquid at 60° C., and lost its fluidity and solidified when allowed to stand at room temperature.

The resin mixture (4.4 g), homogenized by heating to 60° C., was poured into a laboratory dish (with an inner diameter of 90 mm) with a flat bottom. Immediately, 50 ml of deionized water was slowly poured. The resin mixture was dispersed in water, simultaneously precipitating white resin in the form of sponge. An hour later, deionized water was changed and the dish was allowed to stand for another 3 hours. Then the spongy resin was taken out and dried.

A sample with an average thickness of 3.4 mm cut out from the obtained resin had a bulk density of 0.18 g/cm3. Since the specific gravity of the aliphatic ester-amide copolymer was 1.14, the volume ratio was 6.3. The spongy resin had a laminar structure with a large number of voids observed on the surface but a relatively small number of voids in the inside of the sample.

The porous resins obtained by using the mixtures of aliphatic ester-amide copolymers prepared in Test Examples 18 to 20 with organic solvents and removing the organic solvents to change the configurations of the resin compositions can be used as various kinds of filters, moisture absorbing sheets, and further biodegradable materials in agriculture, forestry or fishery by taking advantage of the biodegradable characteristics of the copolymer.

TEST EXAMPLE 22

ε-Caprolactone and ε-caprolactam were polymerized by ring-opening with sodium as an initiator to obtain an opaque milk-white aliphatic ester-amide copolymer with an amide unit ratio of 30 mol % and a weight-average molecular weight of 14,000.

The obtained aliphatic ester-amide copolymer (25 parts) was homogeneously dissolved in a solution of calcium chloride (25 parts) in methanol (25 parts) by stirring with heating to about 60° C. The obtained resin mixture was milky viscous liquid at 60° C., and lost its fluidity and solidified when allowed to stand at room temperature. The resin mixture was diluted 10 times by weight with methanol.

When the above resin mixture was added dropwise with stirring by a magnetic stirrer into aqueous solution of acetone at a volume ratio of acetone and water of 1:2, the resin precipitated in the form of particles. The precipitated resin was separated, dried and examined with the scanning electron microscope. The resin was homogeneous porous fine particles with diameters from 1 to 10 μm with a lot of pores observed on the surface and inside.

TEST EXAMPLE 23

A resin mixture diluted with 10 times (by weight) of methanol was prepared as described in Test Example 22. When the resin mixture was added dropwise into water stirred with magnetic stirrer, the resin precipitated in the form of particles. Compared with the resin particles in Test Example 21, a little more sticking were observed between particles, but examination with the scanning electron microscope of the precipitated resin separated and dried showed that it was homogeneous porous fine particles with diameters from 1 to 20 μm.

TEST EXAMPLE 24

A resin mixture liquid was prepared as described in Test Example 22 except that it was diluted 3 times (by weight) with methanol. When the resin mixture was added dropwise into diethyl ether stirred with a magnetic stirrer, the resin precipitated in the form of fine particles. The precipitated resin was separated, dried in the incubator at 30° C. at a relative humidity of about 30% and then allowed to stand in a room at a relative humidity of about 60%. The calcium chloride in the fine particles deliquesced and fine particles became moist, which proved that the fine particles obtained in the example had good moisture-absorption characteristics.

As shown in Test Examples 22 to 24, the aliphatic ester-amide copolymers can be made into porous fine particles by using the aliphatic ester-amide copolymers dissolved or dispersed in an organic solvent which is not harmful to the human body and modifying the configuration thereof through removing the organic solvent from the mixture without using any toxic or environmentally harmful solvent.

TEST EXAMPLE 25

ε-Caprolactone and ε-caprolactam were polymerized by ring-opening with sodium as an initiator to obtain an aliphatic ester-amide copolymer. The copolymer was opaque and milk-white, and had an amide unit ratio of 30 mol % and a weight-average molecular weight of 14,000.

The above aliphatic ester-amide copolymer (25 parts) was homogeneously dissolved in a solution of calcium chloride (10 parts) in methanol (100 parts) by stirring with heating to about 60° C. The obtained resin mixture was milky viscous liquid at about 60° C., and lost its fluidity and solidified when allowed to stand at room temperature.

Into the resin mixture which was in a homogeneous viscous solution state with heating to 60° C., a granular compound fertilizer (a commercially available fertilizer of phosphorus, ammonium nitrate and potassium) with a particle diameter of 3 mm and a mean weight of 25 mg was dipped and taken out, the surface of the fertilizer being covered with the resin mixture. The fertilizer was allowed to stand in the incubator at about 30° C. at a relative humidity of about 30% so that the methanol evaporated and the resin coating was obtained. The coated granular fertilizer was 29 mg in mean weight and the weight ratio of the resin coating to the fertilizer granules was 16%.

The ability of the resin coating to restrain fertilizer components from dissolution was examined in the following manner. The coated granular fertilizer was put in a test tube fed with 10 ml of water and the concentration of phosphorus components dissolved in water was measured at regular intervals by means of ICP emission spectroscopic analyzer (SPS-4000 type manufactured by Seiko Electronics, Japan). Also for an uncoated granular fertilizer with a mean weight of 25 mg, the concentration of dissolved phosphorus components was measured regularly in the same manner. The results of both the measurements are shown in FIG. 7.

Figure 7:
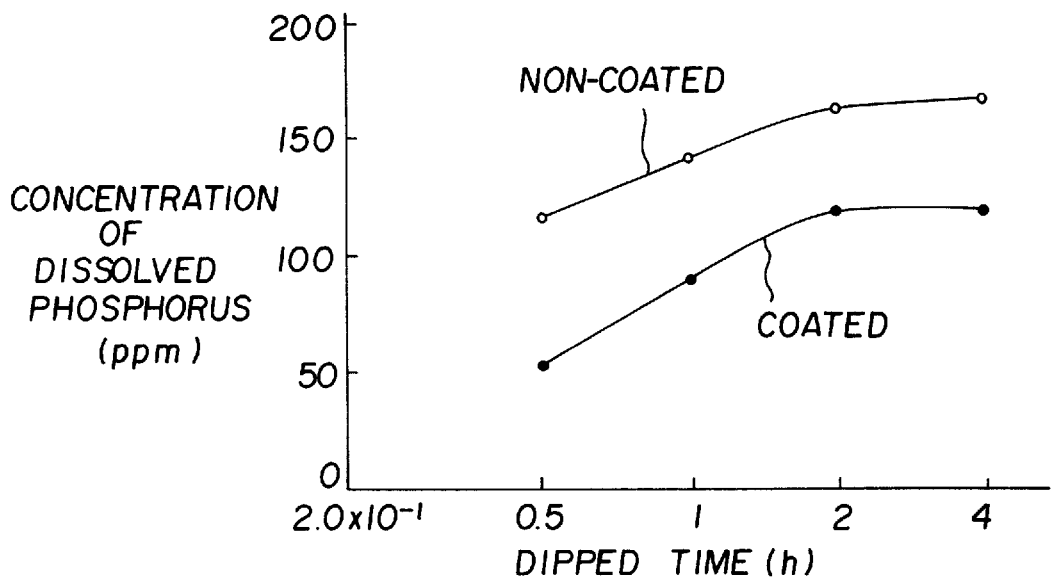
FIG. 7 illustrates changes with time in the concentration of dissolved phosphorus when the coated granular fertilizer of Test Example 25 was dipped in water.

FIG. 7 shows that the dissolution of phosphorus was restrained to about 70% in the coated fertilizer.

The biodegradability of the aliphatic ester-amide copolymer similarly synthesized was also examined by measuring the amount of carbon dioxide gas generated when the powdered copolymer was biodegrated in activated sludge. The result was that the amount of carbon dioxide gas generated for the first 22 days corresponded to 67% biodegradation, proving that the copolymer had sufficient biodegradability. The biodegradation of polycaprolactone ("PLACCEL H1" manufactured by Daicel Chemical Industries) which was biodegradable plastics measured in the same manner was 75%.

A pressed film made of the same aliphatic ester-amide copolymer with an average thickness of 0.34 mm was buried at a depth of 10 mm from the soil surface in a laboratory dish filled with the soil. The dish was then allowed to stand in the incubator at about 30° C. with the water content in the soil maintained at about 50%. One month later, black fungus was seen attaching to the surface of the resin and a part of the film had disappeared. The weight reduced by 40%. Examination of the pressed film with the scanning electron microscope showed that the resin around the fungus had disappeared.

TEST EXAMPLE 26

ε-Caprolactone and ε-caprolactam were polymerized by ring-opening with sodium as an initiator to obtain an aliphatic ester-amide copolymer. The copolymer was translucent and pale-yellow, having an amide unit ratio of 45 mol % and a weight-average molecular weight of 13,000.

The obtained aliphatic ester-amide copolymer (25 parts) was homogeneously dissolved in a solution of calcium chloride (25 parts) in methonal (100 parts) by stirring with heating to about 60° C. The obtained resin mixture was pale-yellow milky viscous liquid at about 60° C., and did not lose its fluidity even when allowed to stand at room temperature.

Into the resin mixture, a granular compound fertilizer (a commercially available fertilizer of phosphorus, ammonium nitrate and potassium) with a granule diameter of about 3 mm and a,mean weight of 25 mg was dipped and taken out, the surface of the fertilizer being covered with the resin mixture. The fertilizer was then dipped in water and dried, thereby the coated granular fertilizer being obtained, which was 32 mg in mean weight (the weight ratio of the resin coating to the fertilizer granules being 28%).

The ability of the resin coating to restrain fertilizer components from dissolution was compared with uncoated fertilizer granules of the same weight in the same manner as described in Test Example 25. The amount of phosphorus components dissolved from the coated granular fertilizer was about 75% of that from the uncoated particulate fertilizer, proving that the resin coating was effective in slow releasing.

The biodegradability of the aliphatic ester-amide copolymer in activated sludge was also measured and the amount of carbon dioxide gas generated for the first 28 days corresponded to 60% biodegradation. Further the biodegradability of a pressed film made of the aliphatic ester-amide copolymer with an average thickness of 0.34 mm was examined in the soil. One month later, black fungus was seen attaching to the surface of the resin and the film was observed partially having disappeared and cracked. The weight reduced by about 35%, which proved that the copolymer had sufficient biodegradability.

TEST EXAMPLE 27

The ester-amide copolymer (25 parts) as used in Test Example 25 was homogeneously dissolved to a solution of calcium chloride (10 parts) in methanol (100 parts) by stirring with heating to about 60° C. The resin mixture was milky viscous liquid at 60° C., and lost its fluidity and solidified when allowed to stand at room temperature. The above aliphatic ester-amide copolymer, when heated, started to soften at 70° C. and melted at 170° C.

Into the above resin mixture which was in a homogeneous viscous liquid state by heating to 60° C., a granular compound fertilizer (a commercially available fertilizer of phosphorus, ammonium nitrate and potassium) with a granular diameter of about 3 mm and a mean weight of 25 mg was dipped and taken out, the surface of the fertilizer being covered with the resin mixture. After the fertilizer was allowed to stand at room temperature for evaporation of the methanol, it was dipped in water and the resin coating was obtained. The resin film of the coated granular fertilizer was examined with the scanning electron microscope and it was found to be a porous film with a number of pores observed on the surface.

Further, the coated granular fertilizer, after being uniformly heated to about 100° C. by means of a hot-air generator so that the resin on the surface softened, was cooled at room temperature. Examination of the film surface with the scanning electron microscope showed that the surface was smooth with few pores seen thereon.

Figure 8:
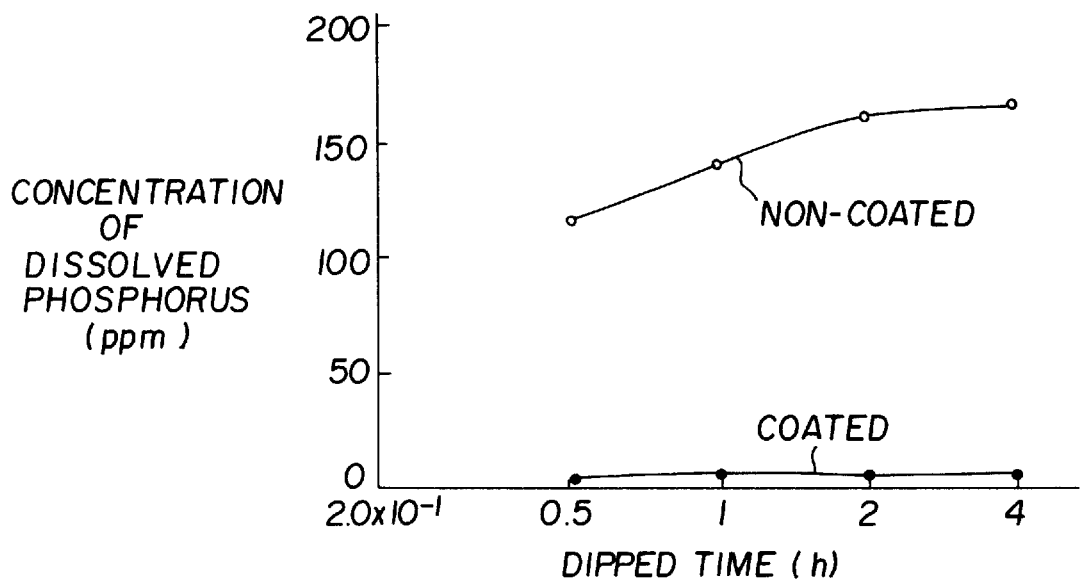
FIG. 8 illustrates changes with time in the concentration of dissolved phosphorus when the coated granular fertilizer of Test Example 26 was dipped in water.

The coated granular fertilizer was dipped in water and the concentration of phosphorus dissolved therefrom was measured with time. For uncoated fertilizer granules with a mean weight of 25 mg, the concentration of phosphorus dissolved therefrom was also measured with time in the same manner. Both the results are shown in FIG. 8.

As clearly shown in FIG. 8, when the film surface was smoothed with heating after the coating, the dissolution of fertilizer components therefrom for the first 4 hours was reduced to about 5% or below, compared with the uncoated fertilizer. The coating was proved to be significantly effective.

TEST EXAMPLE 28

The same aliphatic ester-amide copolymer (25 parts) as used in Test Example 26 was homogeneously dissolved in a solution of calcium chloride (25 parts) in methanol (100 parts) by stirring with heating to about 60° C. The resin mixture was milky pale-yellow viscous liquid at 60° C., and did not lose its fluidity even when allowed to stand at room temperature. The above aliphatic ester-amide copolymer, when heated, started to soften at 130° C. and melted at 170° C.

Into the above resin mixture, a granular compound fertilizer (a commercially available fertilizer of phosphorus, ammonium nitrate and potassium) with a granular diameter of about 3 mm and a mean weight of 25 mg was dipped at room temperature and taken out, the surface of the fertilizer being covered with the resin mixture. After the fertilizer was allowed to stand at room temperature for evaporating the methanol, it was dipped in water and dried at room temperature, thereby the resin coating being obtained. The coating film of the coated granular fertilizer was examined with the scanning electron microscope and it was a porous film with a number of pores observed on the surface.

Further, the coated granular fertilizer, after being uniformly heated to about 150° C. by means of a hot-air generator so that the resin on the film surface softened, was cooled at room temperature. Examination of the film surface with the scanning electron microscope showed that the surface was smoothed compared with the surface before the heating, but some pores were still seen on the surface. Examination of the film with a video microscope showed that the inside of the film contained a number of cells.

Figure 9:
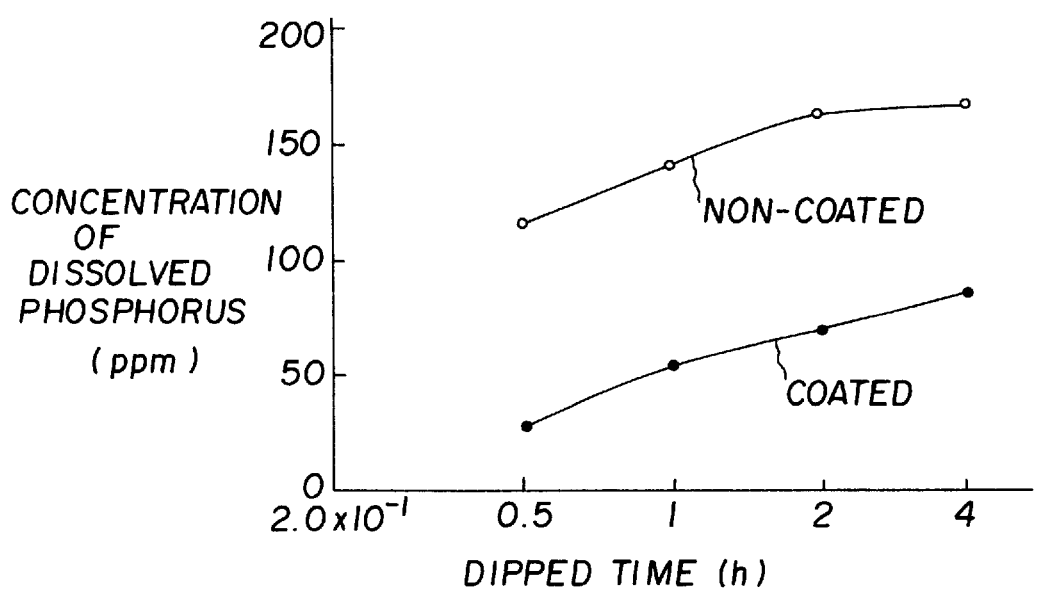
FIG. 9 illustrates changes with time in the concentration of dissolved phosphorus when the coated granular fertilizer of Test Example 27 was dipped in water.

The coated granular fertilizer was dipped in 10 ml of water and the concentration of phosphorus dissolved therefrom was measured with time. For uncoated fertilizer granules with a mean weight of 25 mg, the concentration of dissolved phosphorus was also measured with time in the same manner. Both results are shown in FIG. 9.

As clearly shown in FIG. 9, when the film surface was smoothed with heating after the coating, the dissolution of fertilizer components therefrom for the first 4 hours was reduced to about 50% or below, compared with the uncoated fertilizer.

As shown in 4Test Examples from 25 to 28, by changing the configurations of the aliphatic ester-amide copolymers dissolved in the organic solvents which does not harm the human body by removing the organic solvents, a granular fertilizer can be coated with the biodegradable resins without using any toxic or environmentally harmful solvent so that residual coating resins will not destroy the environment and the coated granular fertilizer with excellent slow-effectiveness can be obtained.

What is claimed is:

1. A composition of an aliphatic ester-amide copolymer which is soluble in an organic solvent with an $LD_{50}$ value (orally administered to a rat) of about 2,000 mg/kg or more.

2. A composition according to claim 1 in which the aliphatic ester-amide copolymer has a weight-average molecular weight from about 1,000 to about 10,000.

3. A composition according to claim 2 in which the aliphatic ester-amide copolymer comprises;

an ester unit represented by the following formula (1):

wherein $R_1$ represents a $C_{1-6}$ straight-chain alkylene group or a branched chain alkylene group in which a part of the hydrogen atoms of said straight-chain alkylene group is/are substituted with a $C_{1-3}$ alkyl group, and/or the following formula (2):

wherein $R_2$ represents a $C_{2-6}$ straight-chain alkylene group or a branched chain alkylene group in which a part of the hydrogen atoms of said straight-chain alkylene group is/are substituted with a $C_{1-3}$ alkyl group and $R_3$ represents a $C_{2-10}$ straight-chain alkylene group or a branched chain alkylene group in which a part of the hydrogen atoms of said straight-chain alkylene group is/are substituted with a $C_{1-3}$ alkyl group; and an amide unit represented by the following formula (3):

$$—NH—R_4—CO— \qquad (3)$$

wherein $R_4$ represents a $C_{2-12}$ straight-chain alkylene group or a branched chain alkylene group in which a part of the hydrogen atoms of said straight-chain alkylene group is/are substituted with a $C_{1-3}$ alkyl group, and/or the following formula (4):

$$—NH—R_5—NHCO—R_6—CO— \qquad (4)$$

wherein $R_5$ represents a $C_{2-6}$ straight-chain alkylene group or a branched chain alkylene group in which a part of the hydrogen atoms of said straight-chain alkylene group is/are substituted with a $C_{1-3}$ alkyl group and $R_6$ represents a $C_{2-10}$ straight-chain alkylene group or a branched chain alkylene group in which a part of the hydrogen atoms of said straight-chain alkylene group is/are substituted with a $C_{1-3}$ alkyl group.

4. A composition according to claim 2 in which the aliphatic ester-amide copolymer is biodegradable.

5. A composition according to claim 1 in which the aliphatic ester-amide copolymer contains aliphatic amide units at a ratio from about 10 to about 80 mol % on the main chain.

6. A composition according to claim 1 in which the aliphatic ester-amide copolymer is a modified aliphatic ester-amide copolymer in which a part or all of the hydrogen atoms of the amide groups thereof are substituted with an alkoxymethyl and/or hydroxymethyl group.

7. A composition according to claim 6 in which the ester unit of the modified aliphatic ester-amide copolymer is represented by the formula (1):

$$—O—R_1—CO— \qquad (1)$$

wherein $R_1$ represents a $C_{1-6}$ straight-chain alkylene group or a branched chain alkylene group in which a part of the hydrogen atoms of said straight-chain alkylene group is/are substituted with a $C_{1-3}$ alkyl group, and/or the formula (2):

$$—O—R_2—OCO—R_3—CO— \qquad (2)$$

wherein $R_2$ represents a $C_{2-6}$ straight-chain alkylene group or a branched chain alkylene group in which a part of the hydrogen atoms of said straight-chain alkylene group is/are substituted with a $C_{1-3}$ alkyl group and $R_3$ represents a $C_{2-10}$ straight-chain alkylene group or a branched chain alkylene group in which a part of the hydrogen atoms of said straight-chain alkylene group is/are substituted with a $C_{1-3}$ alkyl group.

8. A composition according to claim 6 in which the modified aliphatic ester-amid copolymer contains an amide unit represented by the following formula (3'):

$$—NR_7—R_4—CO— \qquad (3')$$

wherein $R_7$ represents a hydrogen atom, an alkoxymethyl or hydroxymethyl group and $R_4$ represents a $C_{2-12}$ straight-chain alkylene group or a branched chain alkylene group in which a part of the hydrogen atoms of said straight-chain alkylene group is/are substituted with a $C_{1-3}$ alkyl group, and/or the following formula (4'):

$$—NR_7—R_5—NR_7CO—R_6—CO— \qquad (4')$$

wherein two $R_7$ are, the same or different, as defined in the above formula (3'), $R_5$ represents a $C_{2-6}$ straight-chain alkylene group or a branched chain alkylene group in which a part of the hydrogen atoms of said straight-chain alkylene group is/are substituted with a $C_{1-3}$ alkyl group, and $R_6$ represents a $C_{2-10}$ straight-chain alkylene group or a branched chain alkylene group in which a part of the hydrogen atoms of said straight-chain alkylene group is/are substituted with a $C_{1-3}$ alkyl group.

9. A composition according to claim 6 in which the alkoxymethyl group is represented by the following formula (5):

$$—CH_2—O—R_8 \qquad (5)$$

wherein $R_8$ represents a $C_{1-6}$ straight-chain alkyl group or a branched chain alkyl group in which a part of the hydrogen atoms of said straight-chain alkyl group is/are substituted with a methyl group.

10. A composition according to claim 6 in which the modified aliphatic ester-amide copolymer is biodegradable.

11. A composition according to claim 6 in which the modified aliphatic ester-amide copolymer has amide units at a ratio from about 10 to about 80 mol % on the main chain.

12. A composition according to claim 6 in which the product of the ratio of amide units wherein the hydrogen atoms of the amide groups are substituted with alkoxymethyl and/or hydroxymethyl to all the amide units of said copolymer and the ratio of all the amide units to all the units of said copolymer is from about 0.1 to about 0.6.

13. A composition according to claim 6 in which the peak attributable to crystalline amide groups on the differential scanning calorimeter (DSC) chart either shifts to a temperature which is lower than that of the peak of an unmodified aliphatic ester-amide copolymer or disappears.

14. A composition according to claim 1 comprising an aliphatic ester-amide copolymer and an inorganic metal salt.

15. A composition according to claim 14 in which the inorganic metal salt is at least one inorganic metal salt selected from the group consisting of a halide, nitrate and thiocyanate of a metal of group Ia, IIa, Ib or IIb of the periodic table having an atomic number of 38 or less, or a mixture thereof.

16. A composition according to claim 14 in which the aliphatic ester-amide copolymer is constituted of;

an ester unit represented by the formula (1):

$$—O—R_1—CO— \qquad (1)$$

wherein $R_1$ represents a $C_{1-6}$ straight-chain alkylene group or a branched chain alkylene group in which a part of the hydrogen atoms of said straight-chain alkylene group is/are substituted with a $C_{1-3}$ alkyl group, and/or the formula (2):

$$—O—R_2—OCO—R_3—CO— \qquad (2)$$

wherein $R_2$ represents a $C_{2-6}$ straight-chain alkylene group or a branched chain alkylene group in which a part of the hydrogen atoms of said straight-chain alkylene group is/are substituted with a $C_{1-3}$ alkyl group and $R_3$ represents a $C_{2-10}$ straight-chain alkylene group or a branched chain alkylene group in which a part of the hydrogen atoms of said straight-chain alkylene group is/are substituted with a $C_{1-3}$ alkyl group; and an amide unit represented by the formula (3):

$$—NH—R_4—CO— \qquad (3)$$

wherein $R_4$ represents a $C_{2-12}$ straight-chain alkylene group or a branched chain alkylene group in which a part of the hydrogen atoms of said straight-chain alkylene group is/are substituted with a $C_{1-3}$ alkyl group, and/or the following formula (4)

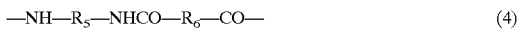

$$-NH-R_5-NHCO-R_6-CO- \quad (4)$$

wherein $R_5$ represents a $C_{2-6}$ straight-chain alkylene group or a branched chain alkylene group in which a part of the hydrogen atoms of said straight-chain alkylene group is/are substituted with a $C_{1-3}$ alkyl group and $R_6$ represents a $C_{2-10}$ straight-chain alkylene group or a branched chain alkylene group in which a part of the hydrogen atoms of said straight-chain alkylene group is/are substituted with a $C_{1-3}$ alkyl group.

17. A composition according to claim 14 in which the aliphatic ester-amide copolymer is biodegradable.

18. A composition according to claim 2 in which the aliphatic ester-amide copolymer contains aliphatic amide units at a ratio from about 10 to about 80 mol % on the main chain.

19. A solution of an aliphatic ester-amide copolymer in which the copolymer is dissolved in an organic solvent with an $LD_{50}$ value (orally administered to a rat) of about 2,000 mg/kg or more in the presence or absence of an inorganic metal salt.

20. A solution according to claim 19 in which the organic solvent is at least one compound selected from the group consisting of an aliphatic alcohol wherein the number of carbon atoms on a continuous carbon chain is 6 or less, a glycolic ether the compound represented by the following formula (A):

$$R_9(OCH_2CH_2)nR_{10} \quad (4)$$

wherein $R_9$ represents a $C_{1-4}$ alkyl group, $R_{10}$ represents a hydroxyl, $C_{1-4}$ alkoxy, amino or acetyl group, and n is an integer from 1 to 3, an aliphatic acid having 5 or less carbon atoms, an aliphatic sulfoxide, and an aliphatic amide, or a mixture thereof.

21. A composition according to claim 19 in which the organic solvent has a boiling point from about 30° C. to about 250° C.

22. A solution according to claim 20 in which the aliphatic alcohol is methanol, ethanol, propanol, isopropanol, ethylene glycol or glycerin.

23. A solution according to claim 20 in which the glycolic ether type compound is 2-ethoxyethanol, 2-methoxyethanol, 2-ethoxyethyl acetate, 2-(2-ethoxyethoxy)ethanol or 2-methoxyethylamine.

24. A solution of an aliphatic ester-amide copolymer in which the copolymer is dissolved in an organic solvent with an $LD_{50}$ value (orally administered to a rat) of about 2,000 mg/kg or more in the presence or absence of an inorganic metal salt, wherein the aliphatic ester-amide copolymer is as claimed in claim 2.

25. A solution of an aliphatic ester-amide copolymer in which the copolymer is dissolved in an organic solvent with an $LD_{50}$ value (orally administered to a rat) of about 2,000 mg/kg or more in the presence or absence of an inorganic metal salt, wherein the aliphatic ester-amide copolymer is a modified aliphatic ester-amide copolymer as claimed in claim 6.

26. A solution of an aliphatic ester-amide copolymer in which the copolymer is dissolved in an organic solvent with an $LD_{50}$ value (orally administered to a rat) of about 2,000 mg/kg or more in the presence of an inorganic metal salt, the solution comprising an aliphatic ester-amide copolymer and inorganic metal salt as claimed in claim 14.

27. A molded or casted article produced by dissolving a composition of an aliphatic ester-amide copolymer in an organic solvent with an $LD_{50}$ (orally administered to a rat) value of about 2,000 or more in the presence or absence of an inorganic metal salt and then removing the solvent from the solution to change a configuration of the copolymer.

28. A molded or casted article produced by dissolving a composition of an aliphatic ester-amide copolymer in an organic solvent with an $LD_{50}$ (orally administered to a rat) value of about 2,000 or more in the presence or absence of an inorganic metal salt and then removing the solvent from the solution to change a configuration of the copolymer, wherein the composition of the aliphatic ester-amide copolymer is as claimed in claim 2 as the composition of the aliphatic ester-amide copolymer.

29. A molded or casted article produced by dissolving a composition of an aliphatic ester-amide copolymer in an organic solvent with an $LD_{50}$ (orally administered to a rat) value of about 2,000 or more in the presence or absence of an inorganic metal salt and then removing the solvent from the solution to change a configuration of the copolymer, wherein the composition of the aliphatic ester-amide copolymer is as claimed in claim 6.

30. A molded or casted article produced by dissolving a composition of an aliphatic ester-amide copolymer in an organic solvent with an $LD_{50}$ (orally administered to a rat) value of about 2,000 or more in the presence or absence of an inorganic metal salt and then removing the solvent from the solution to change a configuration of the copolymer, wherein the composition of the aliphatic ester-amide copolymer and inorganic metal salt are as claimed in claim 14.

* * * * *